United States Patent [19]

Wakimoto et al.

[11] Patent Number: 5,414,561
[45] Date of Patent: May 9, 1995

[54] TELECENTRIC IMAGING OPTICAL SYSTEM

[75] Inventors: Zenji Wakimoto; Takahisa Hayashi, both of Kyoto, Japan

[73] Assignee: Dainippon Screen Mfg. Co., Ltd., Kyoto, Japan

[21] Appl. No.: 7,329

[22] Filed: Jan. 21, 1993

[30] Foreign Application Priority Data

Jan. 23, 1992 [JP] Japan .................. 4-034280

[51] Int. Cl.$^6$ .............................................. G02B 15/14
[52] U.S. Cl. ................................ 359/663; 359/690
[58] Field of Search ............................................ 359/663

[56] References Cited

U.S. PATENT DOCUMENTS

| 4,637,690 | 1/1987 | Miyamae et al. ............ | 359/683 |
| 4,867,545 | 9/1989 | Wakimoto et al. | |
| 4,913,540 | 4/1990 | Minefuji ...................... | 359/663 |
| 5,026,145 | 6/1991 | Marvi et al. ................. | 359/663 |

FOREIGN PATENT DOCUMENTS

| 3108018 | 12/1981 | Germany ..................... | 359/663 |
| 0004013 | 1/1986 | Japan .......................... | 359/663 |
| 0339393 | 3/1956 | Switzerland . | |
| 1260923 | 3/1969 | United Kingdom . | |
| 1248362 | 1/1970 | United Kingdom . | |

OTHER PUBLICATIONS

Patent Abstracts of Japan, vol. 7, No. 260, JP 58-142310, Aug. 24, 1983.

Primary Examiner—Edward K. Look
Assistant Examiner—Christopher Verdier
Attorney, Agent, or Firm—Ostrolenk, Faber, Gerb & Soffen

[57] ABSTRACT

A telecentric imaging optical system has first and third lens systems each having a positive power, and a second lens system having a negative power. In the imaging optical system, the second lens system is disposed between the first and the third lens systems. The imaging optical system satisfies the following inequalities:

$$f1/2.5 < -f2 < 2 \cdot f1$$

$$f3/2.5 < -f2 < 2 \cdot f3$$

where f1 is the focal length of the first lens system, f2 is that of the second lens system and f3 is that of the third lens system. A rear focal point of a composite lens system consisting of the first and the second lens systems substantially coincides with the front focal point of the third lens system. The telecentric imaging optical system has a large variable power ratio.

15 Claims, 28 Drawing Sheets

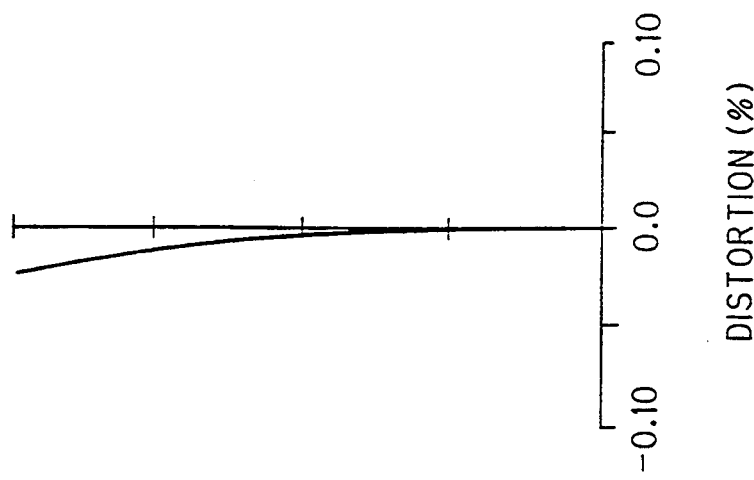

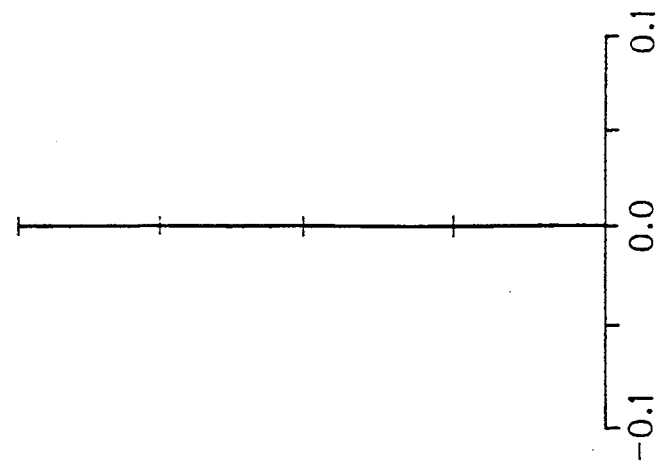
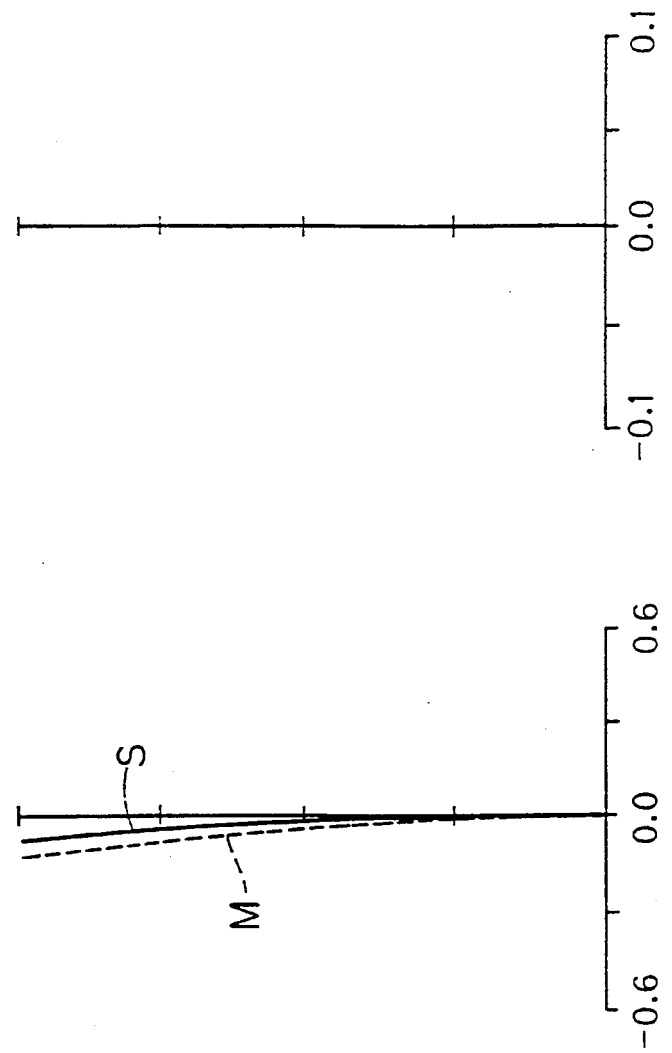
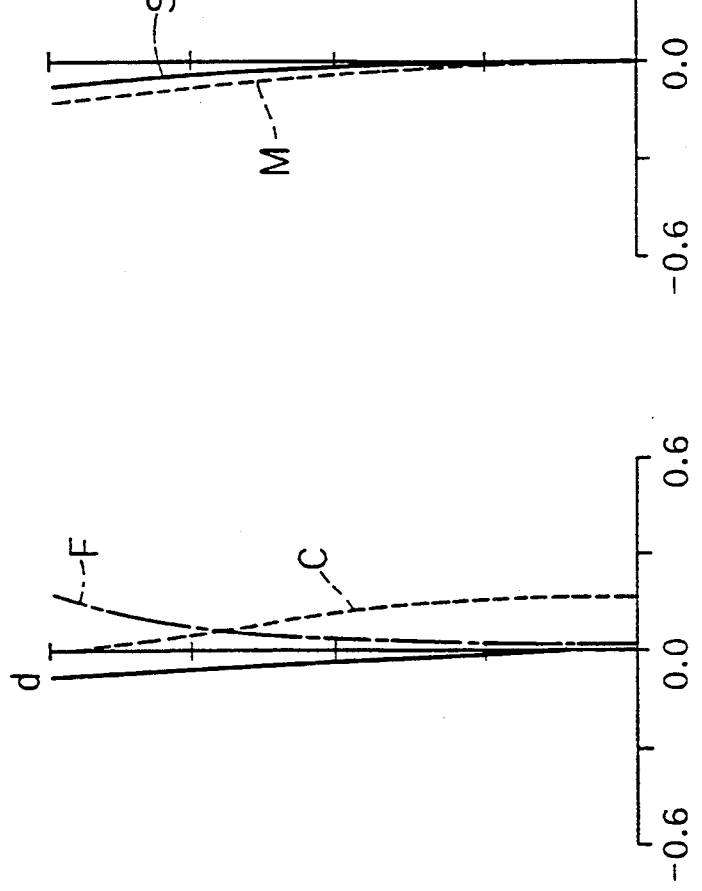

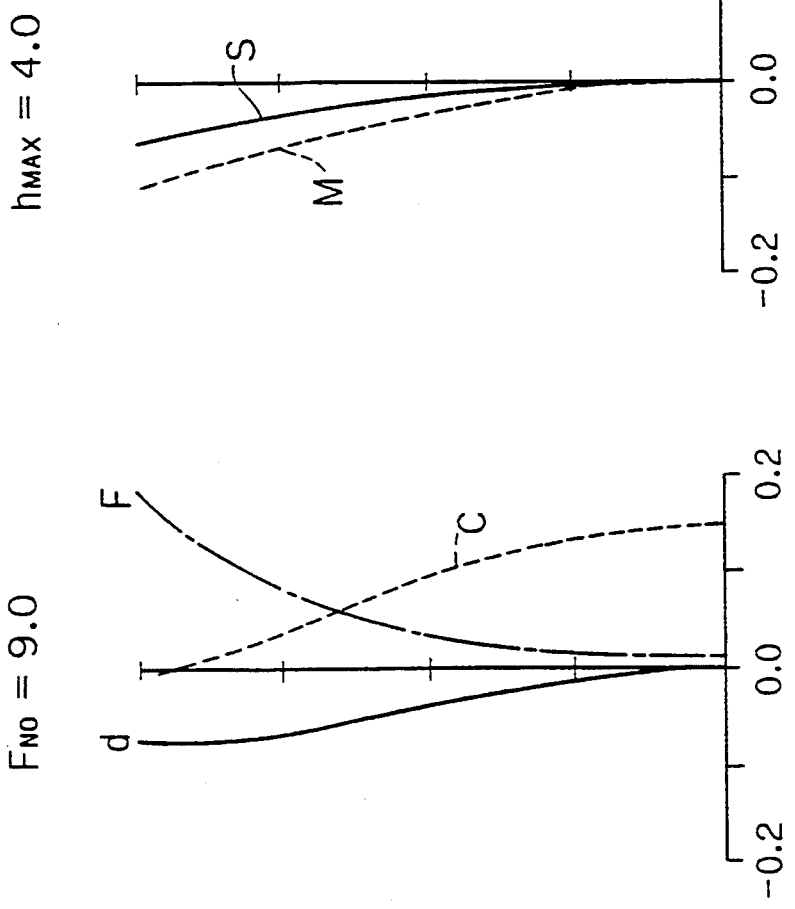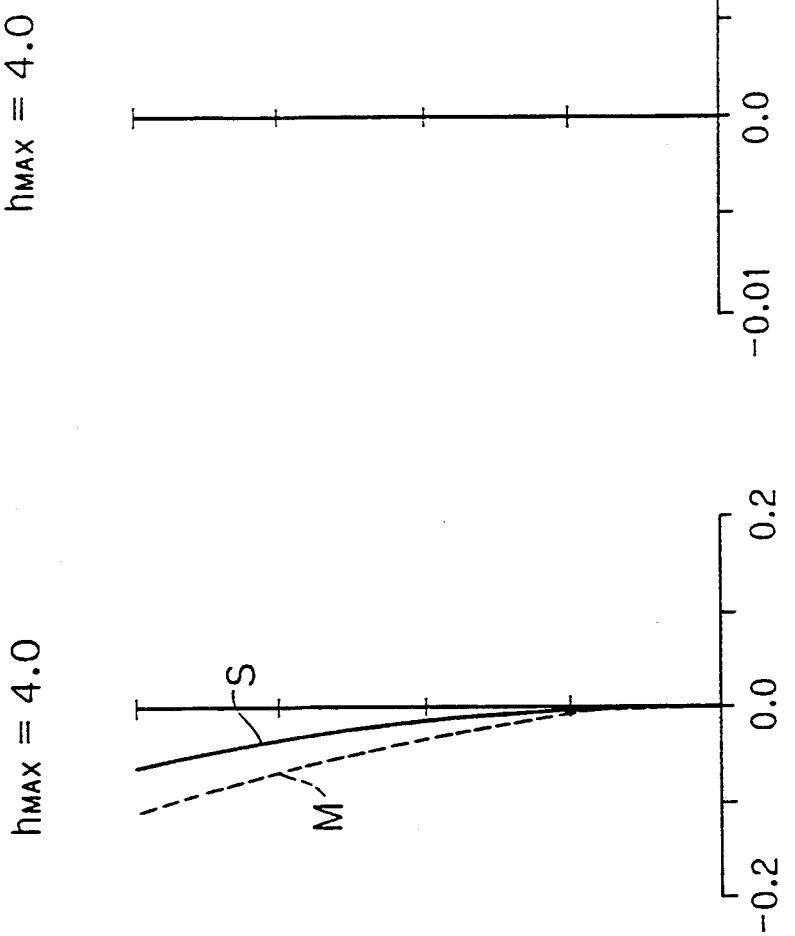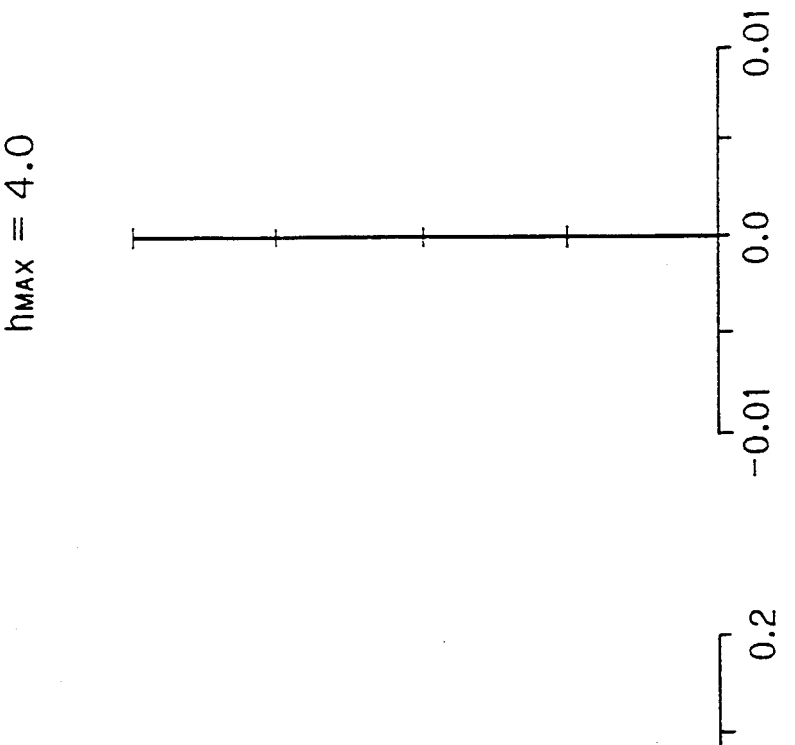

$h_{MAX} = 4.0$
DISTORTION (%)

$h_{MAX} = 4.0$
ASTIGMATISM $F_{NO} = 10.0$
SPHERICAL ABERRATION

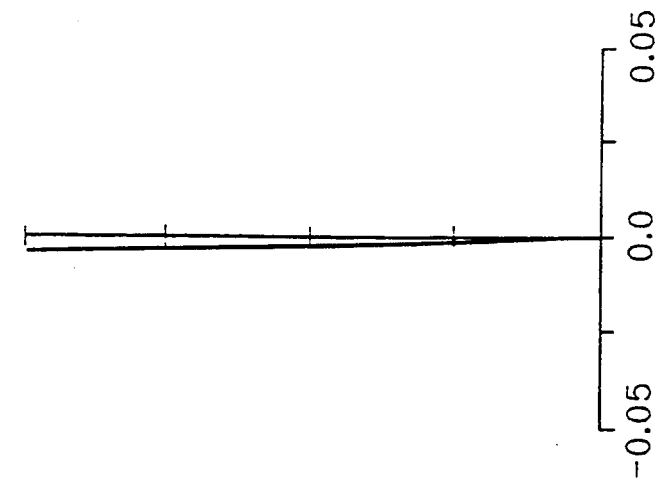

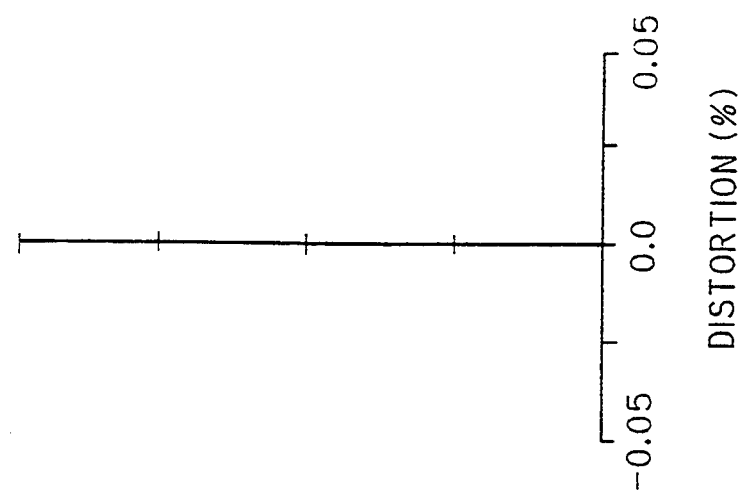
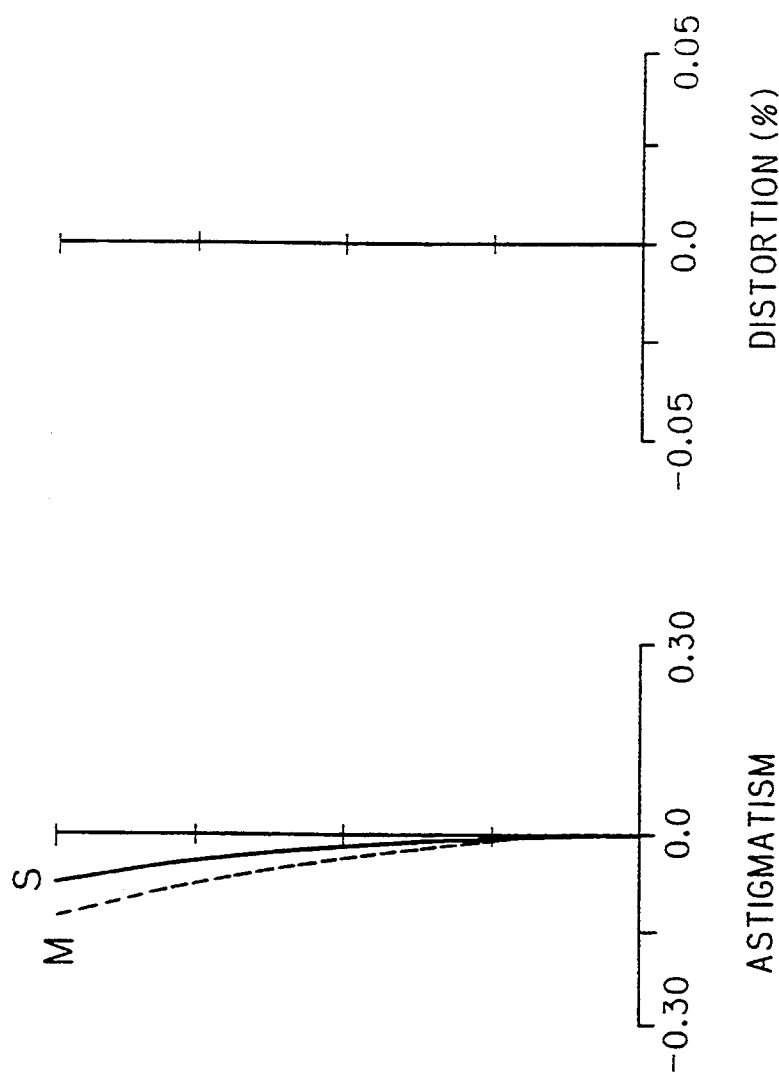
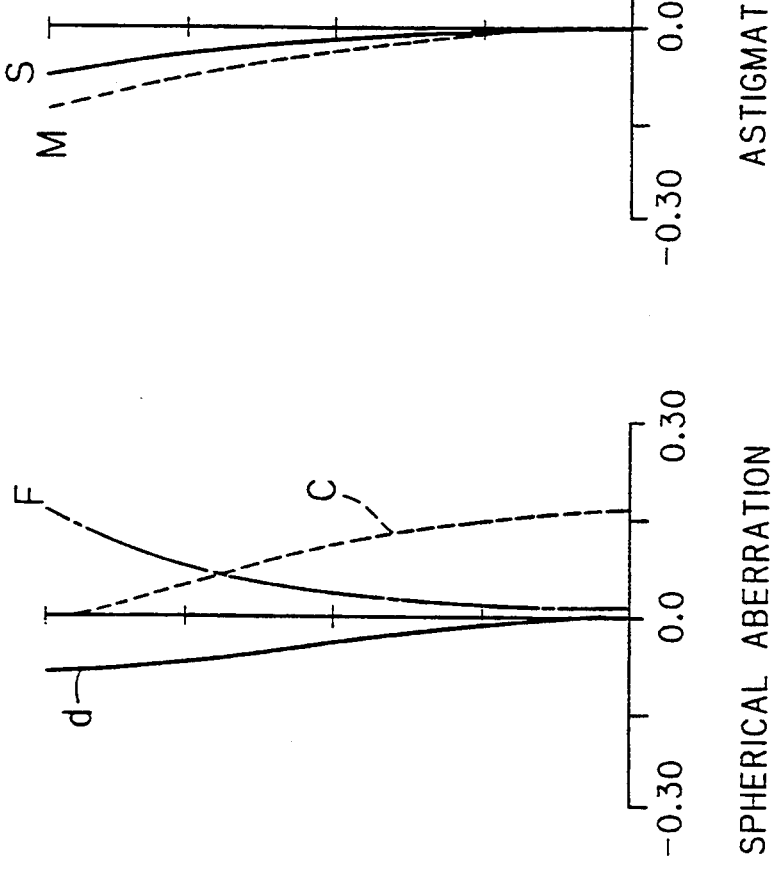

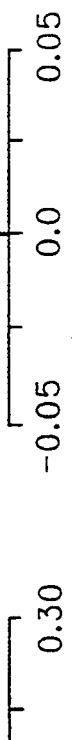
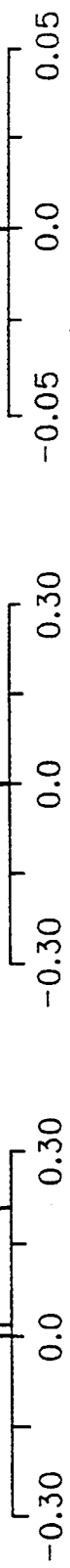

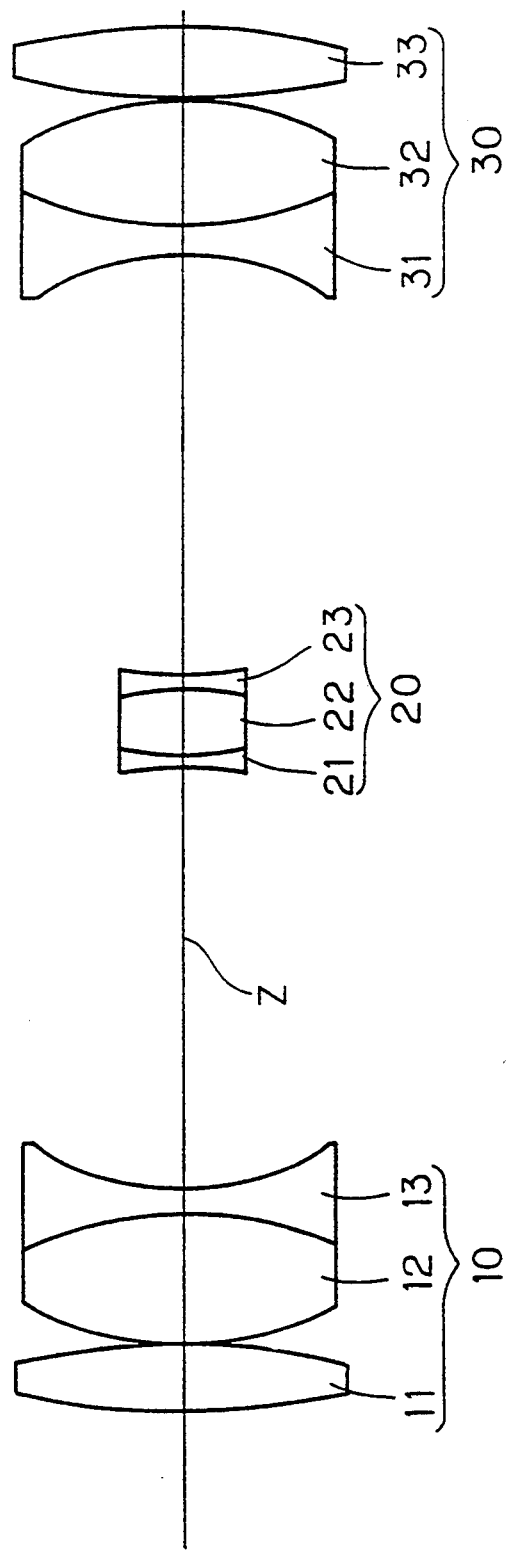

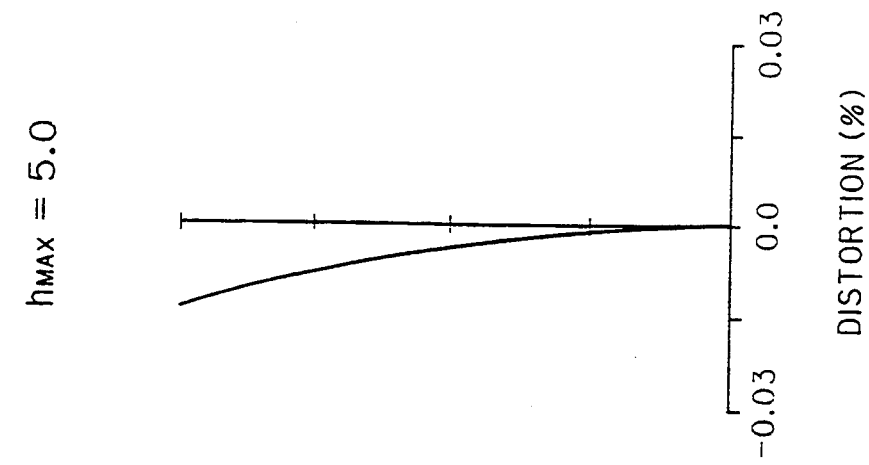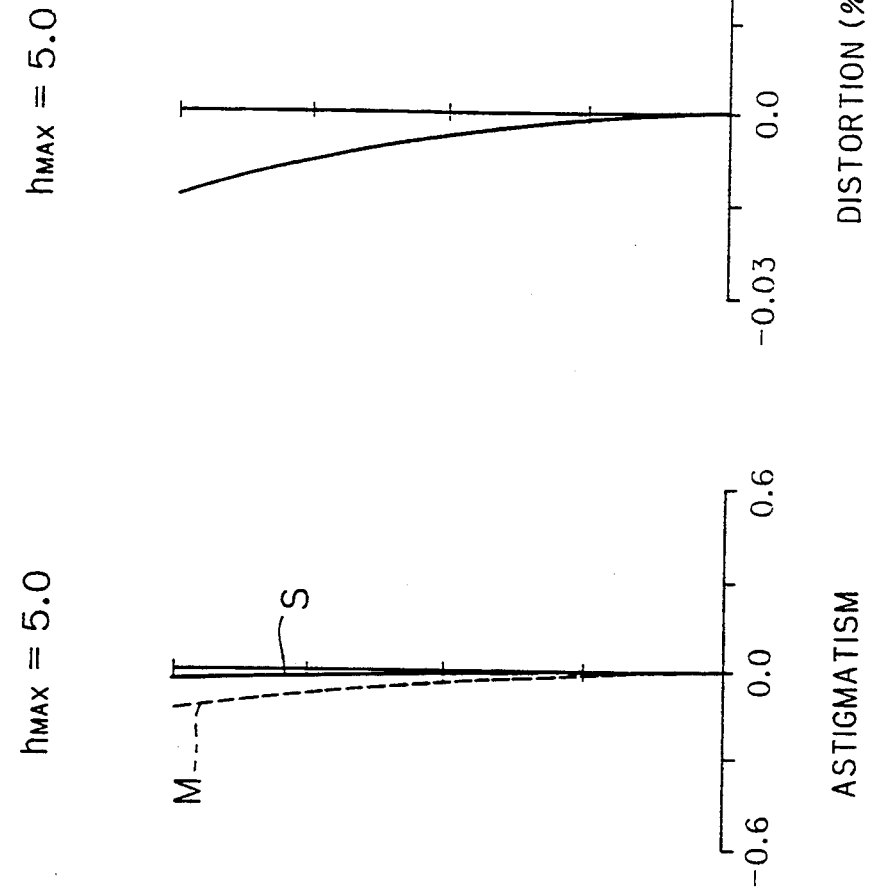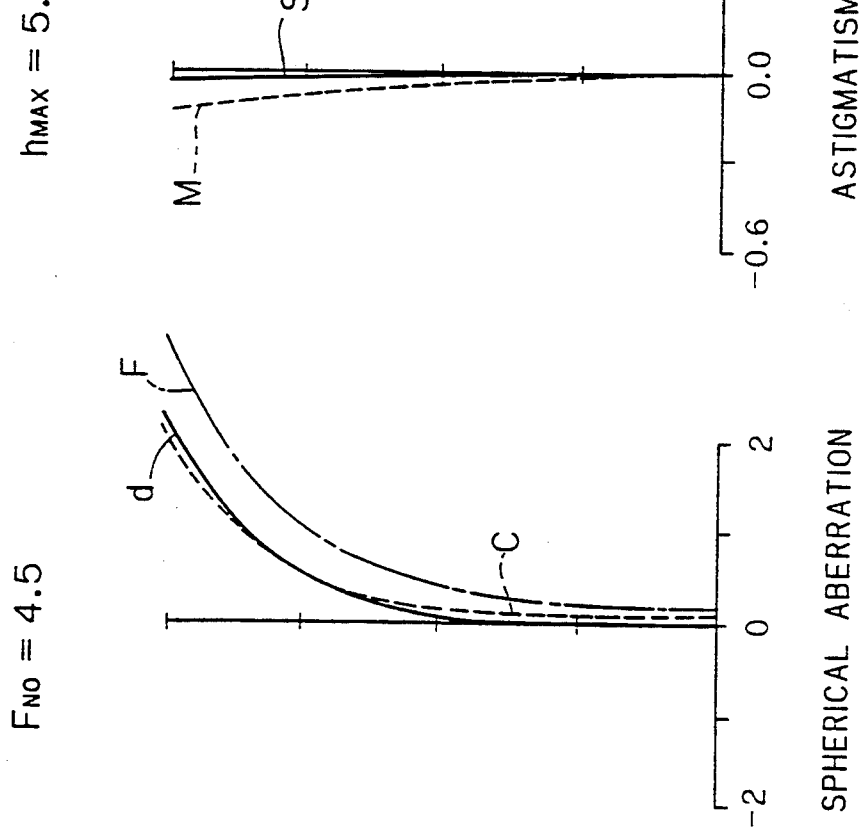

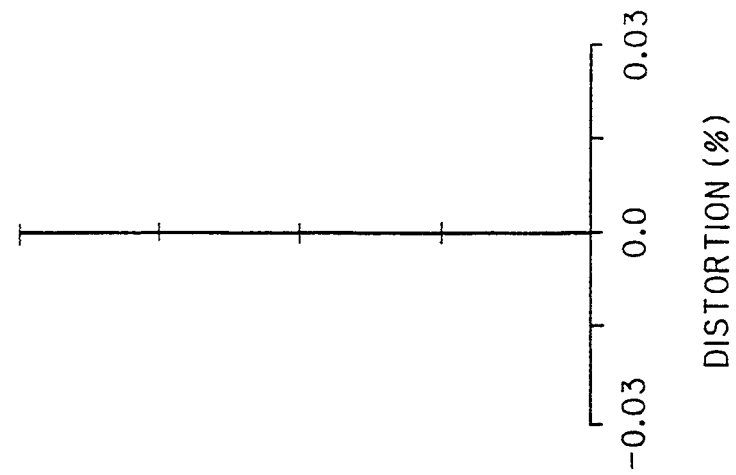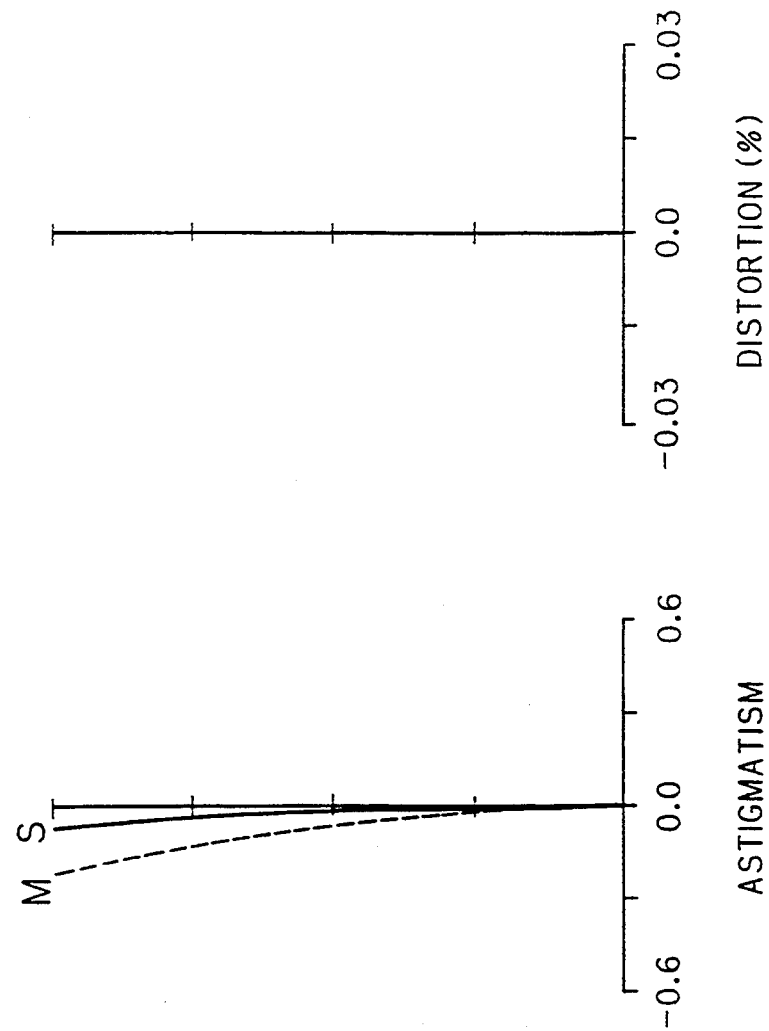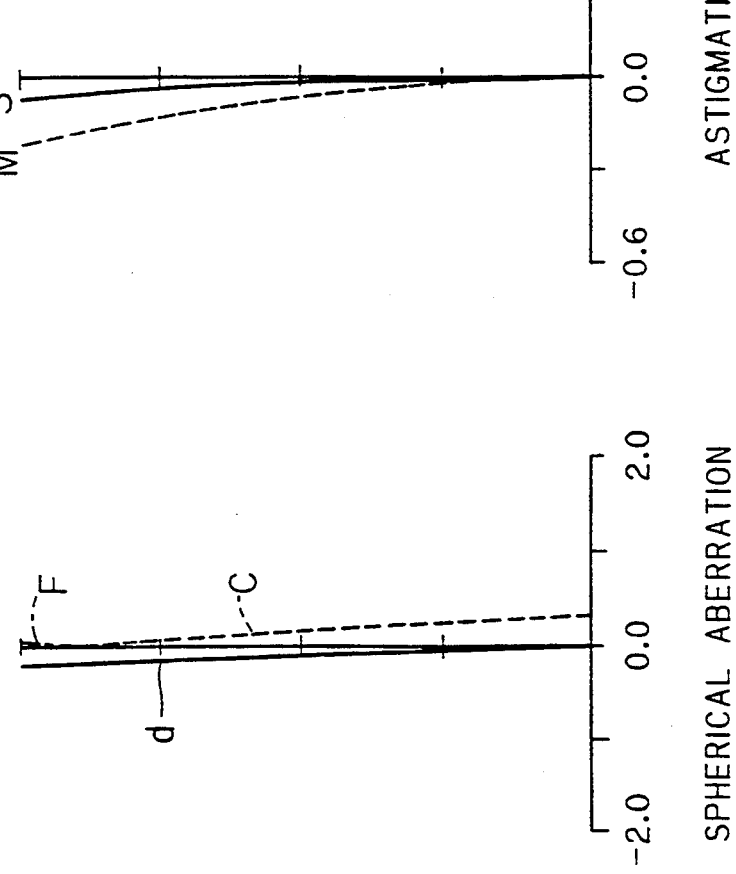

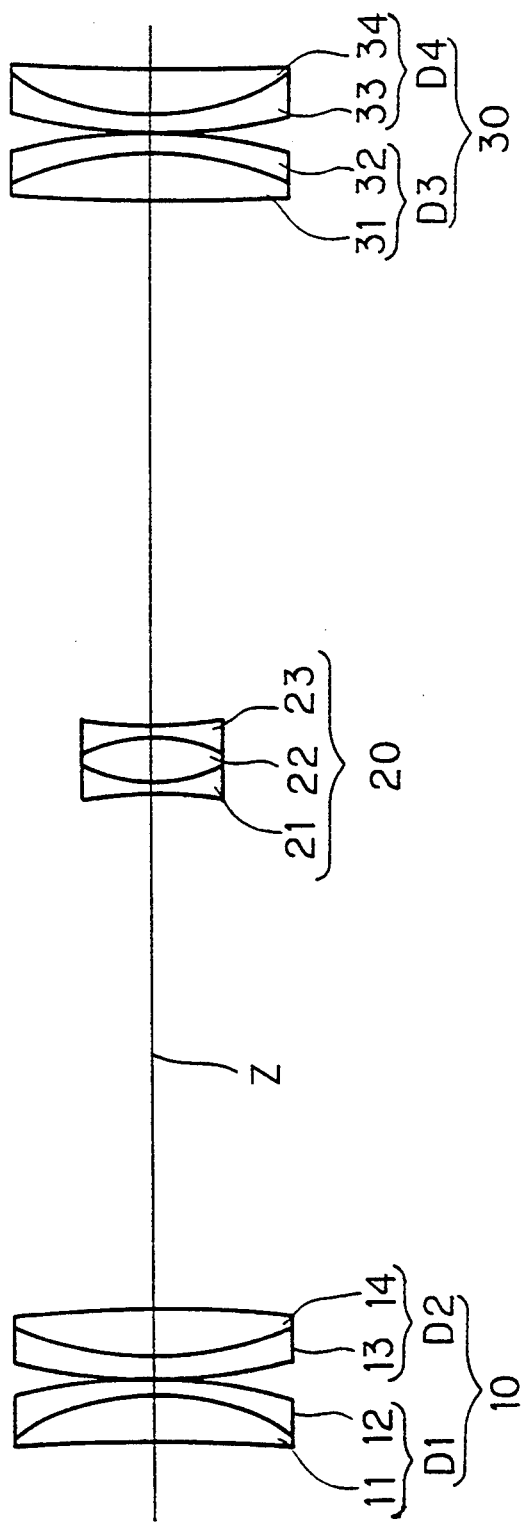

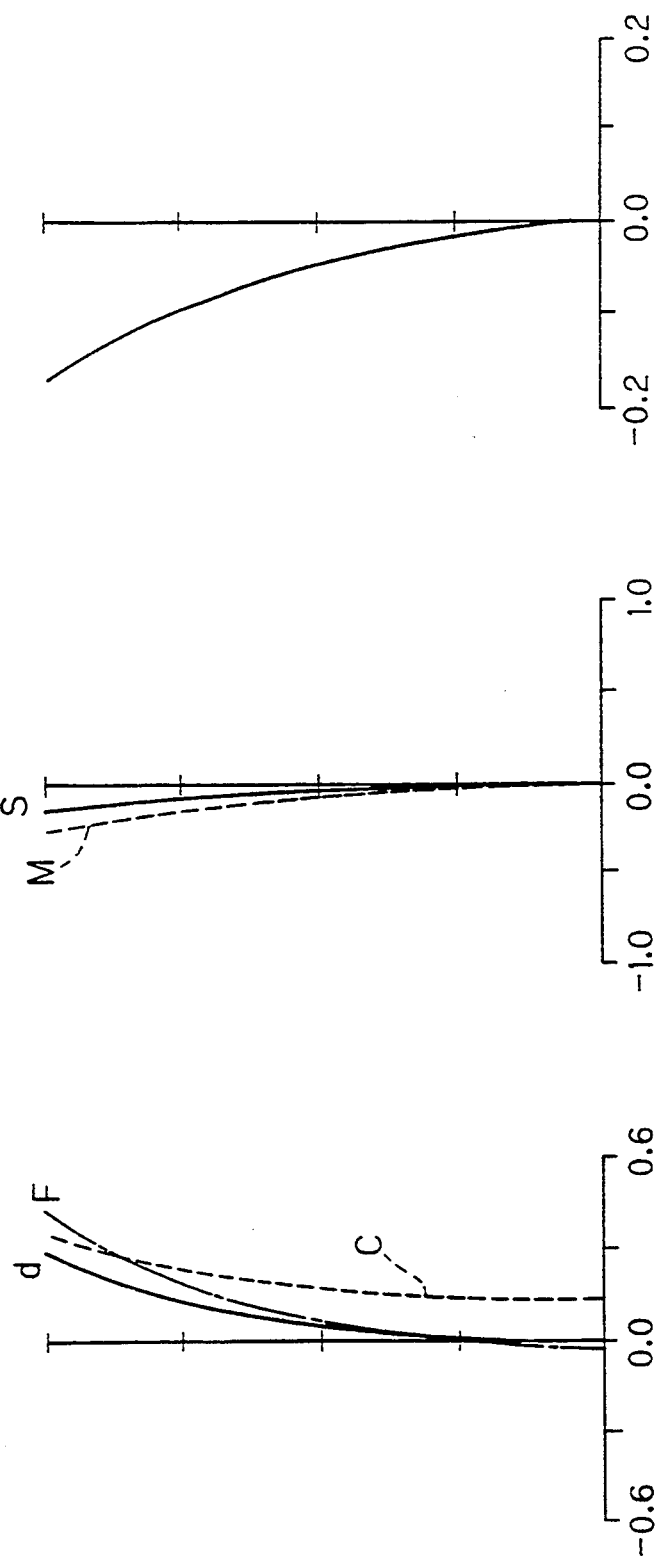

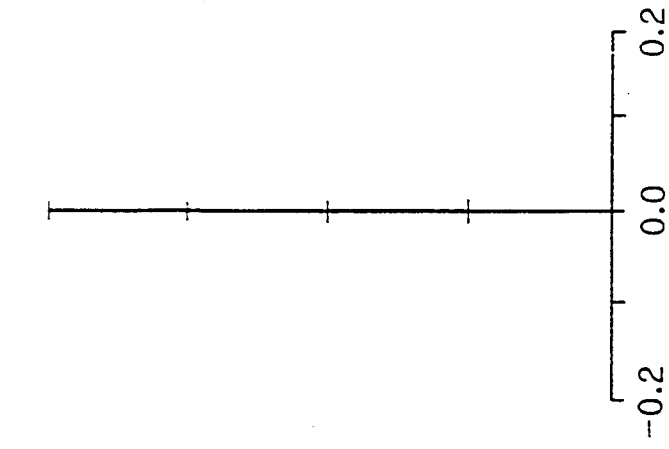

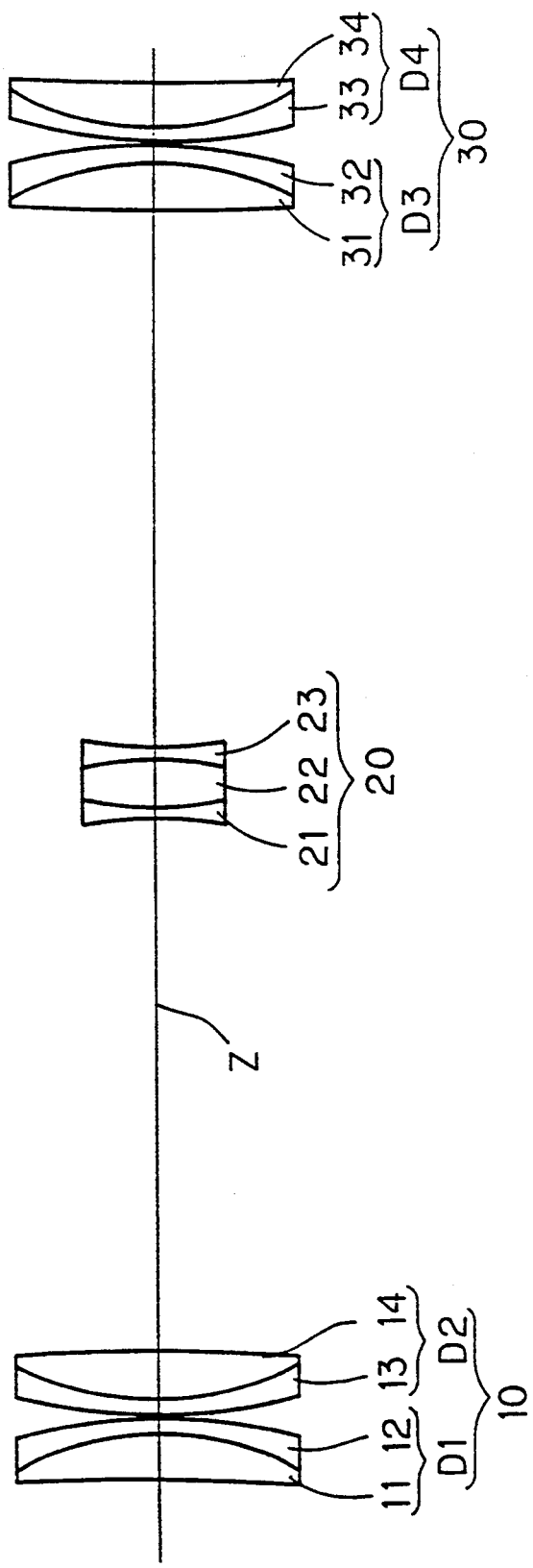

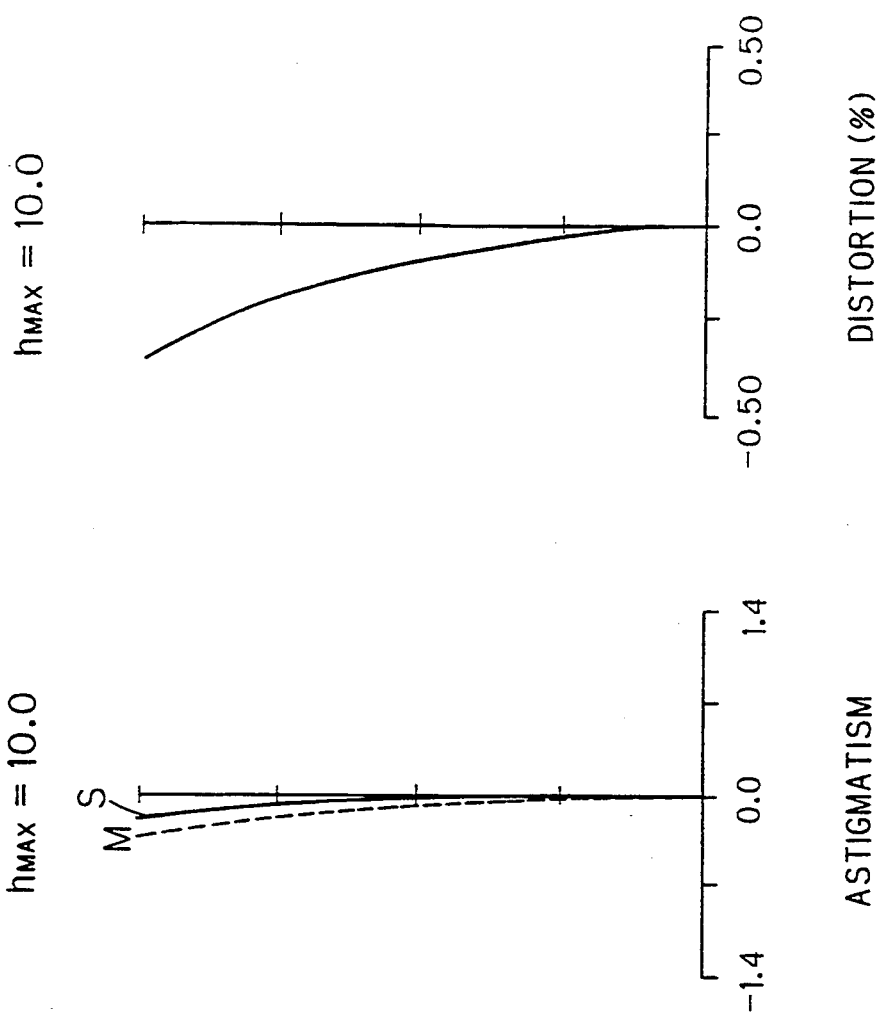

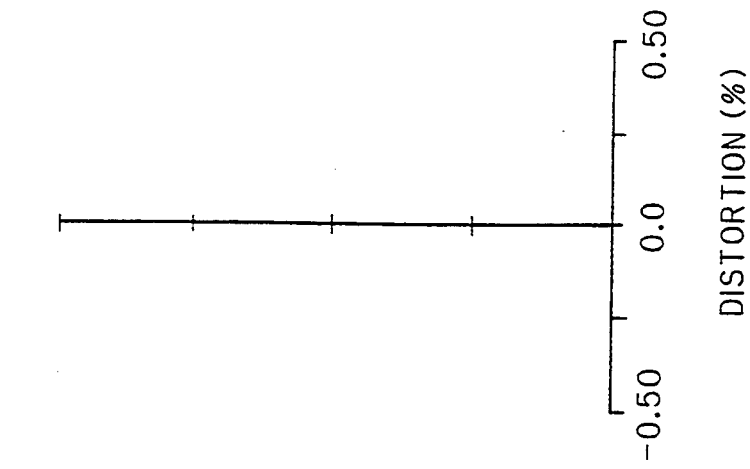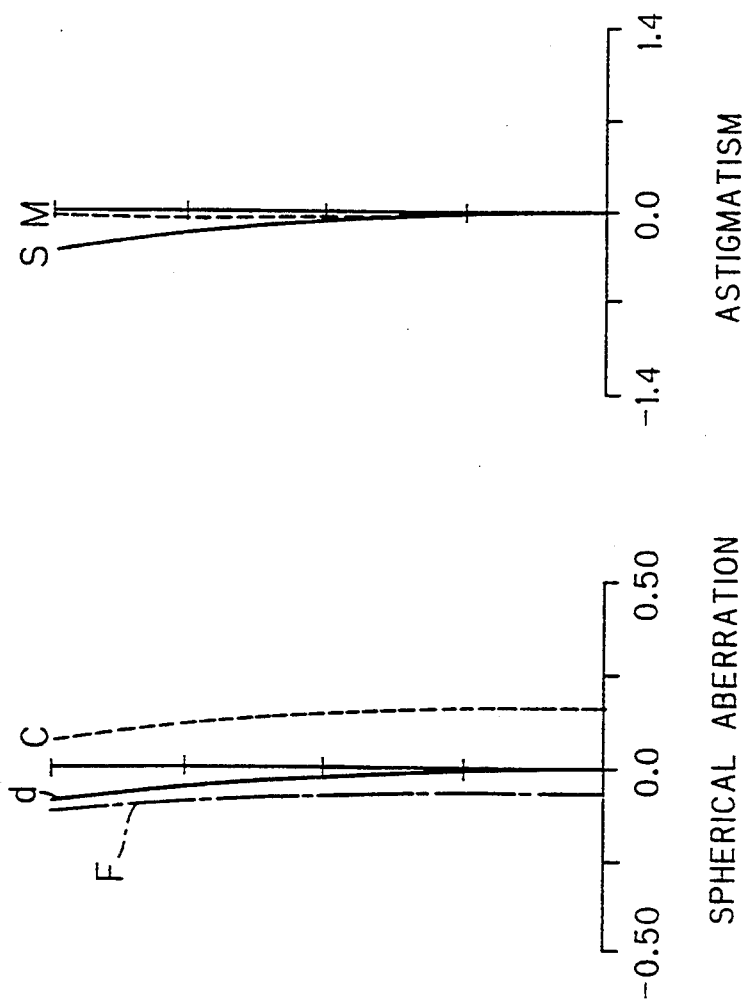

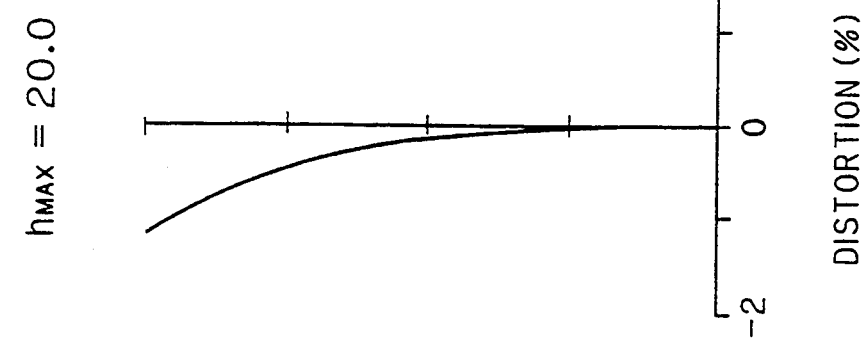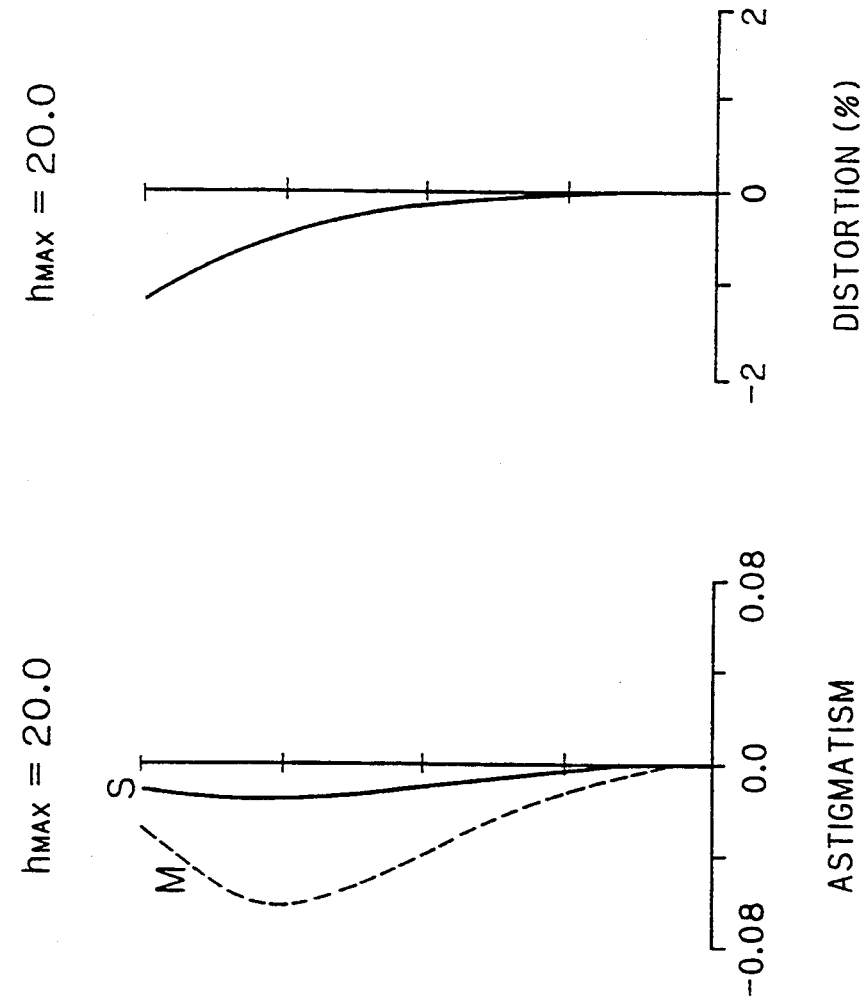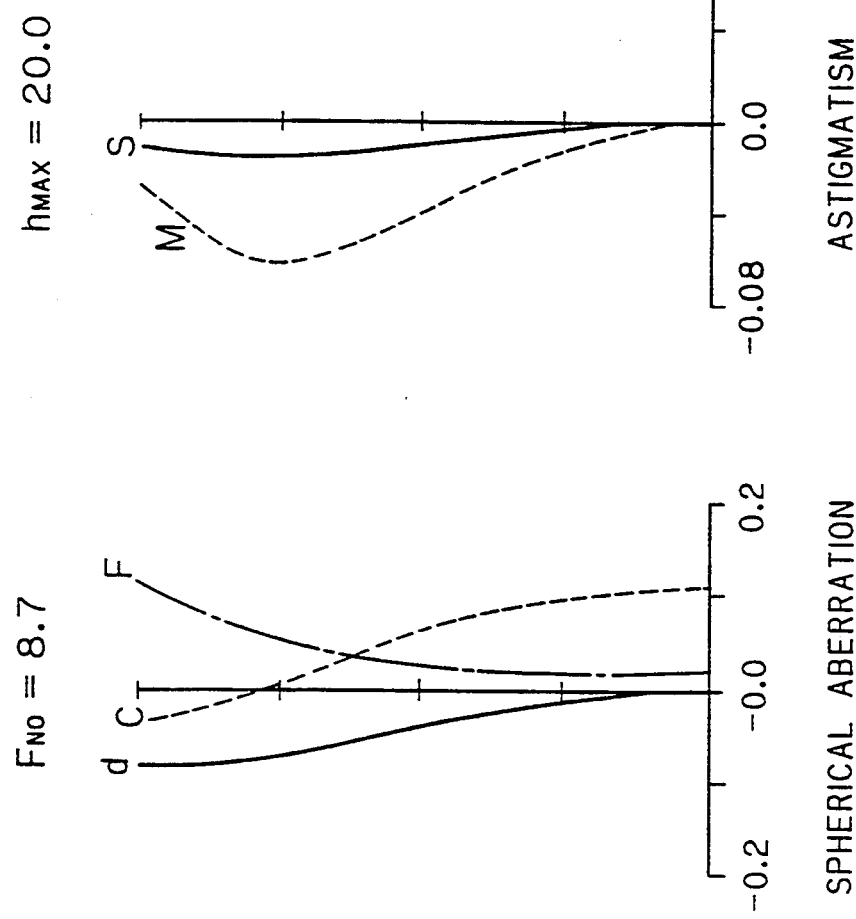

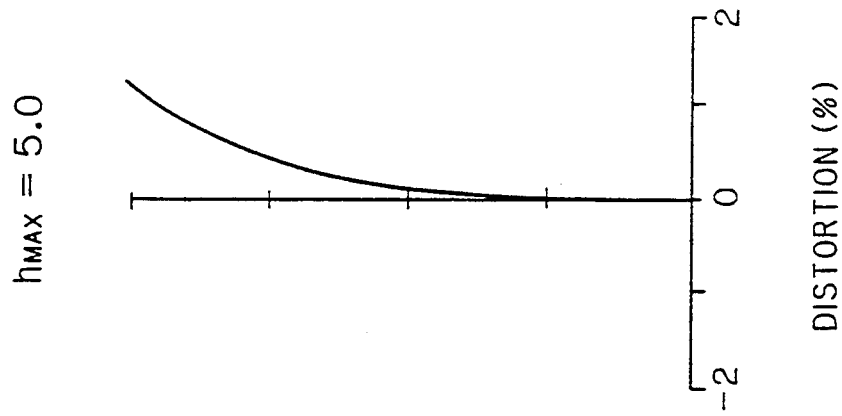
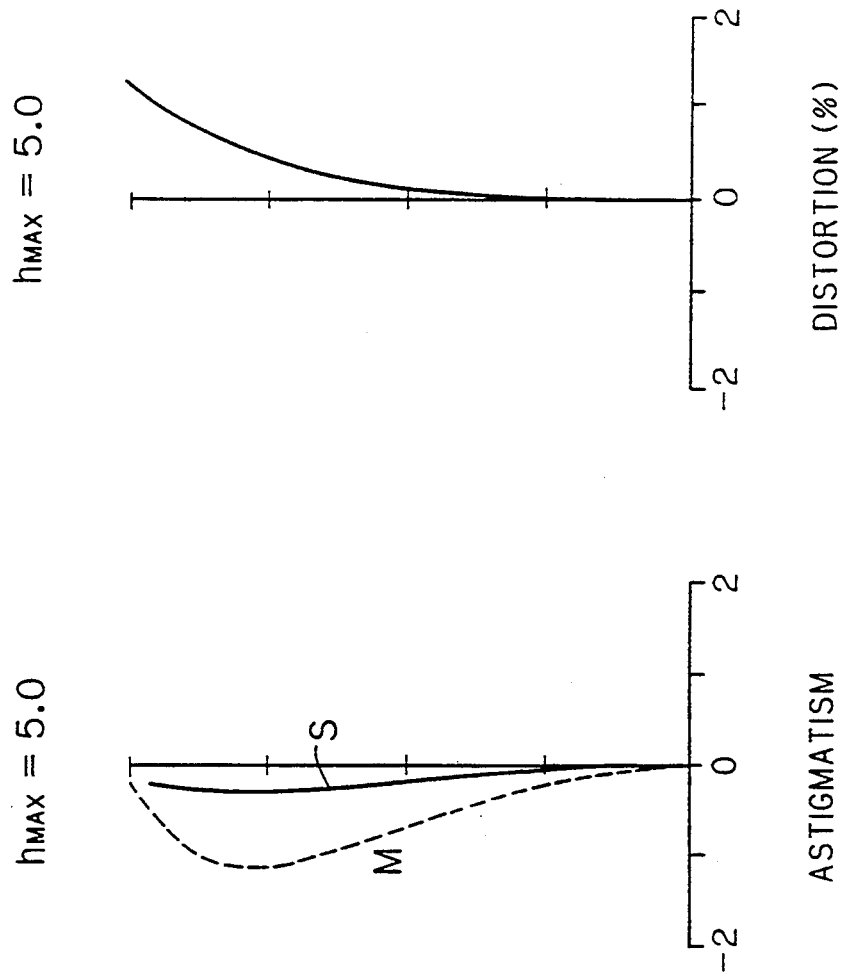
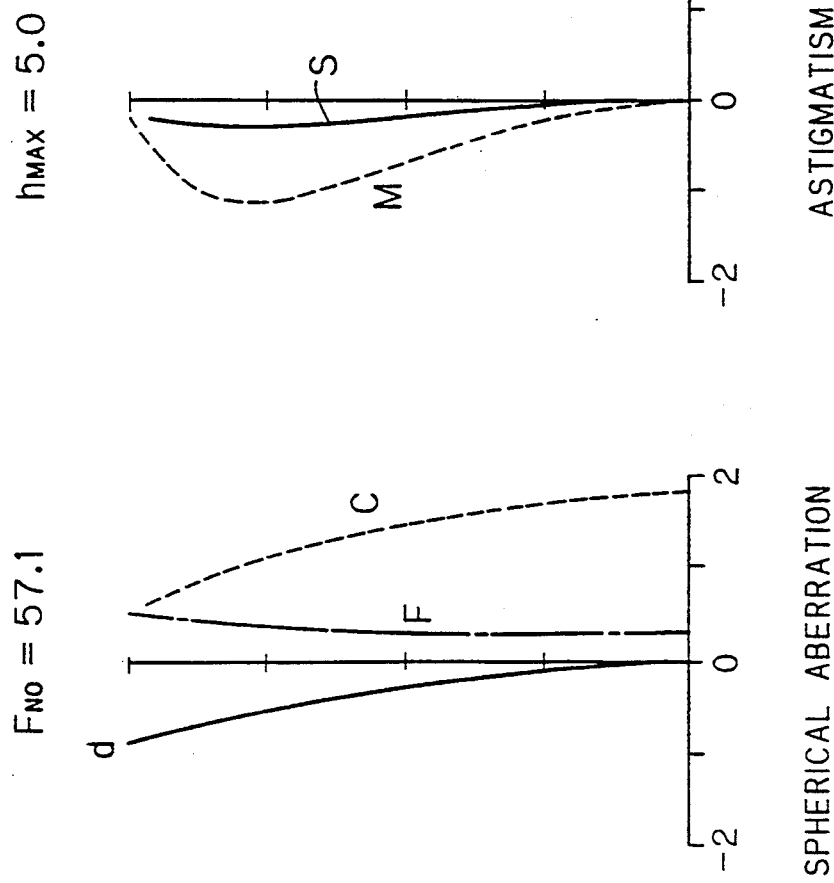

TELECENTRIC IMAGING OPTICAL SYSTEM

BACKGROUND OF THE INVENTION

1. Field of the Invention

The present invention relates to a telecentric imaging optical system which has a widely variable imaging magnification.

2. Description of the Related Art

The optical system disclosed in U.S. Pat. No. 4,867,545 can be cited as a conventional telecentric imaging optical system of which can be used at a wide range of imaging magnification. The telecentric imaging optical system revealed in the U.S. Patent requires that a first lens system and a third lens system each have a positive power at the object and the image formation sides and that the rear focal point of the first lens system approximately coincides with the front focal point of the third lens system. Another lens system having a positive power is disposed in the vicinity of these focal points. Hence, a distance between an object and the first lens system is shorter than the focal length of the first lens system and a distance between an image and the third lens system is shorter than the focal length of the third lens system. This in turn reduces a distance between the object and the image. In the optical system, it is easy to increase the numerical aperture.

However, the conventional imaging optical system has a drawback that the range of the variable power is relatively narrow. As can be seen from the U.S. Patent, the variable power ratio is 4 at most, obviously an insufficient ratio. The variable power ratio is a ratio of the maximum minification to the maximum magnification. When, for example, an imaging magnification ranges from −2 to −0.5, the imaging optical system has a variable power ratio of 4.

A further problem with the conventional imaging optical system is as follows. Since the conventional imaging optical system is comprised of the three positive power lens systems, it is theoretically concluded that the Petzval's summation tends to be large in the optical system. If the Petzval's summation is large, there arises greater chances that the image plane is not flat. Therefore, it is difficult to enlarge the size of an image which will be eventually formed.

SUMMARY OF THE INVENTION

The present invention is directed to a telecentric imaging optical system. The telecentric imaging optical system comprises: a first lens system having a positive focal length f1, a second lens system having a negative focal length f2, and a third lens system having a positive focal length f3, the lens systems being disposed in order along an optical axis of the optical system, the second lens system being located between the first lens system and the third lens system; wherein the third lens system is disposed so that the front focal point thereof substantially coincides with the rear focal point of the composite lens system consisting of the first lens system and the second lens system; wherein the focal lengths satisfy the conditions:

$$f1/2.5 < -f2 < 2 \times f1$$

$$f3/2.5 < -f2 < 2 \times f3$$

and wherein at least one of the lens systems is movable along the optical axis so as to change a first distance between the first lens system and the second lens system and a second distance between the second lens system and the third lens system, to thereby vary the magnification of the optical system.

Preferably, the first lens system and the third lens system are fixed on the optical axis, and wherein the second lens system is movable along the optical axis.

Alternatively, the second lens system may have a plurality of lens groups, and wherein the lens groups are movable along the optical axis so as to change the distance therebetween.

Accordingly, it is an object of the present invention to offer a telecentric imaging optical system which has a large variable power ratio.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2C are graphs of spherical aberration, astigmatism and distortion that the telecentric imaging optical system of FIG. 1 creates at an imaging magnification of −0.5;

FIGS. 3A to 3C are graphs of spherical aberration, astigmatism and distortion that the telecentric imaging optical system of FIG. 1 creates at an imaging magnification of −1;

FIGS. 6A to 6C are graphs of spherical aberration, astigmatism and distortion that the telecentric imaging optical system of FIG. 5 creates at an imaging magnification of −0.9;

FIGS. 10A to 10C are graphs of spherical aberration, astigmatism and distortion that the telecentric imaging optical system of FIG. 9 creates at an imaging magnification of −0.8;

FIGS. 11A to 11C are graphs of spherical aberration, astigmatism and distortion that the telecentric imaging optical system of FIG. 9 creates at an imaging magnification of −1;

FIGS. 12A to 12C are graphs of spherical aberration, astigmatism and distortion that the telecentric imaging optical system of FIG. 9 creates at an imaging magnification of −1.25;

FIG. 13 is a view of a telecentric imaging optical system according to a fourth preferred embodiment of the present invention as it would be when used at an imaging magnification of −1;

FIGS. 14A to 14C are graphs of spherical aberration, astigmatism and distortion that the telecentric imaging optical system of FIG. 13 creates at an imaging magnification of −0.5;

FIGS. 15A to 15C are graphs of spherical aberration, astigmatism and distortion that the telecentric imaging optical system of FIG. 13 creates at an imaging magnification of −1;

FIG. 17 is a view of a telecentric imaging optical system according to a fifth preferred embodiment of the present invention as it would be when used at an imaging magnification of −1;

FIGS. 18A to 18C are graphs of spherical aberration, astigmatism and distortion that the telecentric imaging optical system of FIG. 17 creates at an imaging magnification of −0.5;

FIGS. 19A to 19C are graphs of spherical aberration, astigmatism and distortion that the telecentric imaging optical system of FIG. 17 creates at an imaging magnification of −1;

FIG. 21 is a view of a telecentric imaging optical system according to a sixth preferred embodiment of the present invention as it would be when used at an imaging magnification of −1;

FIGS. 22A to 22C are graphs of spherical aberration, astigmatism and distortion that the telecentric imaging optical system of FIG. 21 creates at an imaging magnification of −0.5;

FIGS. 23A to 23C are graphs of spherical aberration, astigmatism and distortion that the telecentric imaging optical system of FIG. 21 creates at an imaging magnification of −1;

FIGS. 26A to 26C are graphs of spherical aberration, astigmatism and distortion that the telecentric imaging optical system of FIG. 25 creates at an imaging magnification of −0.25;

FIGS. 28A to 28C are graphs of spherical aberration, astigmatism and distortion that the telecentric imaging optical system of FIG. 25 creates at an imaging magnification of −4.0.

DESCRIPTION OF THE PREFERRED EMBODIMENTS

Figure 1:
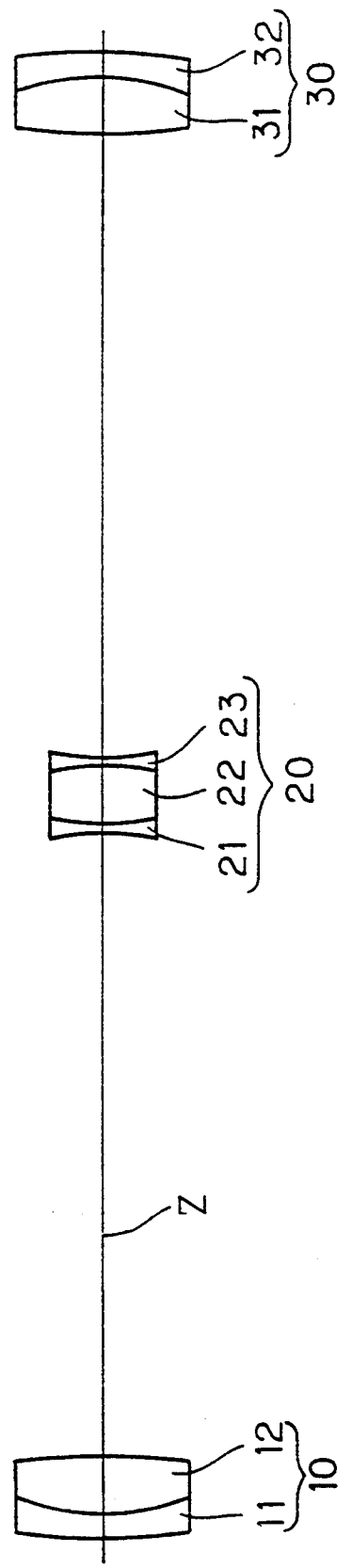
FIG. 1 is a view of a telecentric imaging optical system according to a first preferred embodiment of the present invention as it would be when used at an imaging magnification of −1.
Figure 4A:
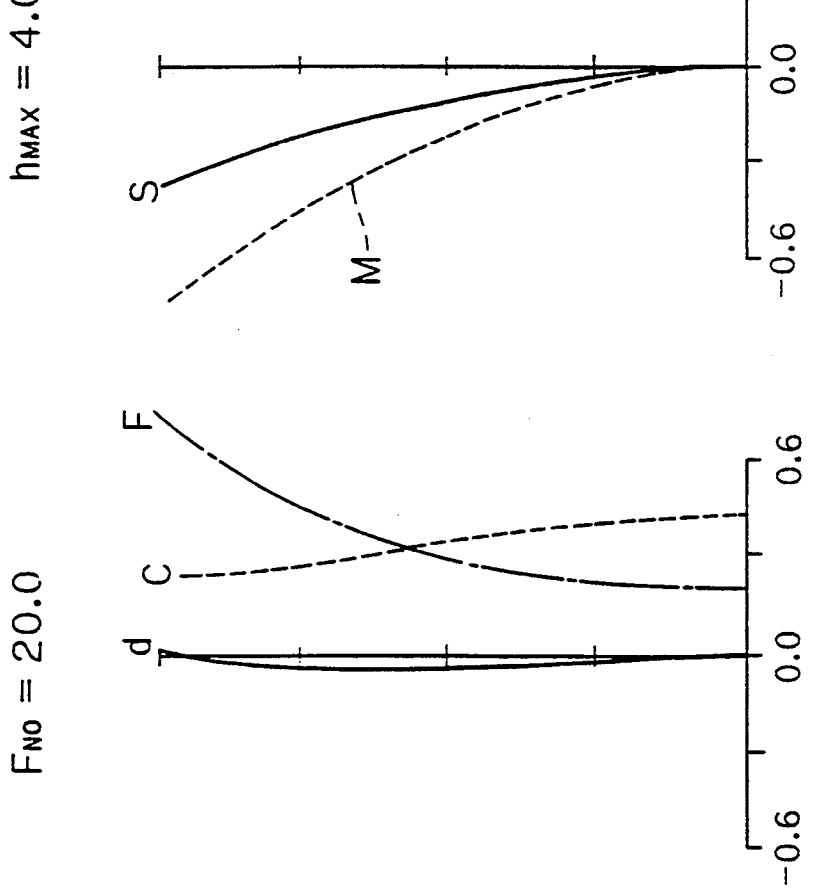
FIGS. 4A to 4C are graphs of spherical aberration, astigmatism and distortion that the telecentric imaging optical system of FIG. 1 creates at an imaging magnification of −2.0.
Figure 4B:
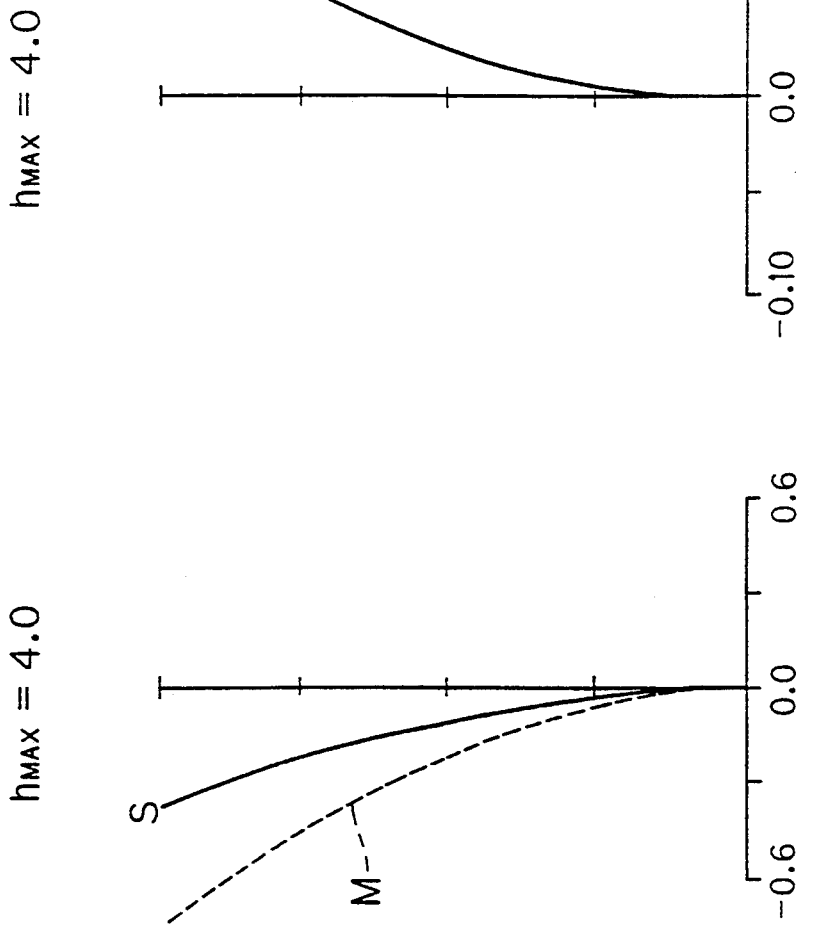
Figure 4C:
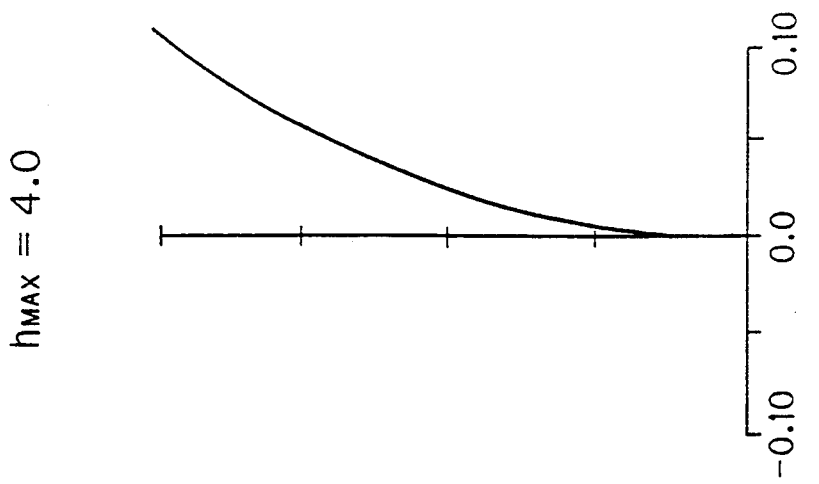

In the first aspect of the present invention, a telecentric imaging optical system comprises first and third lens systems each having a focal length of a positive value and a second lens system which has a focal length of a negative value. The second lens system is disposed between the first and the third lens systems. The imaging magnification of the telecentric imaging optical system is varied by changing a distance between the first and the second lens systems and a distance between the second and the third lens systems. The telecentric imaging optical system of the first aspect is characterized in satisfying the following inequalities:

$$f1/2.5 < -f2 < 2 \cdot f1$$

$$f3/2.5 < -f2 < 2 \cdot f3$$

where f1 is the focal length of the first lens system, f2 is that of the second lens system and f3 is that of the third lens system. The telecentric imaging optical system of the first aspect is also characterized in that a rear focal point of the first and the second lens systems considered as one lens system substantially coincides with a front focal point of the third lens system.

Thus, in the first aspect of the present invention, the telecentric imaging optical system requires that the rear focal point of a composite lens system consisting of the first and the second lens systems substantially coincides with the front focal point of the third lens system.

In the telecentric imaging optical system, the imaging magnification of the system is not varied even if the object distance is changed, and then the distance between the object and the image can be kept constant by appropriately selecting the object distance and the imaging distance. Therefore, the telecentric imaging optical system can vary the imaging magnification of the system under the condition that the object surface and the image surface are fixed by moving the whole system along the optical axis after the image magnification is set.

In terms of structure, the telecentric imaging optical system of the first aspect is similar to an afocal variable power optical system for a telephotograph or a stereoscopic microscope. As known in the art, in an afocal variable power optical system, a positive power lens system, a negative power lens system and another positive power lens system are disposed in that order in such a manner that a light beam enters and leaves the afocal optical system parallel to an optical axis of the afocal optical system. This is where the similarity is found.

On the other hand, a dissimilarity, a large one, is found in the following point. An afocal variable power optical system, likewise a Galileian type telescope, cannot form a real image unless otherwise equipped with an imaging system which is located in front of and/or behind the afocal variable power optical system. In sharp contrast, a telecentric imaging optical system can be categorized in the family of the Keplerian type systems which are capable of forming a real image. The telecentric imaging optical system alone can form, outside of it, a real image of an object which is placed outside the telecentric imaging optical system.

Now, the implications of the inequalities given above will be described. To find characteristics of the telecentric imaging optical system, capabilities of the telecentric imaging optical system are considered by changing the focal length f2 of the second lens system. The focal lengths f1 and f3 of the first and the third lens systems are equally set at 100. Table 1 shows the results of the consideration.

TABLE 1

| f2 | Magnification | Object-Image Distance |
|---|---|---|
| −40 | −10.0 ~ −0.1 | 650 |
| −50 | −7.14 ~ −0.14 | 600 |
| −75 | −4.41 ~ −0.227 | 533.3 |
| −100 | −3.28 ~ −0.305 | 500 |
| −150 | −2.38 ~ −0.42 | 466.7 |
| −200 | −2.0 ~ −0.5 | 450 |
| −250 | −1.67 ~ −0.6 | 440 |

As readily understood from Table 1, the magnification range, i.e., the variable power ratio becomes small if the focal length −f2 of the second lens system exceeds the focal lengths f1 and f3 of the first and the third lens systems. Hence, the focal length −f2 of the second lens system must be shorter than, or at most equal to, double the focal lengths f1 and f3 of the first and the third lens systems in order to ensure a large variable power ratio.

When the focal length −f2 of the second lens system is shorter than the focal lengths f1 and f3 of the first and the third lens systems, on the contrary, although the variable power ratio is large, a distance between an object and an image is similarly large. This leads to a conclusion that it is desirable to set the focal length −f2 of the second lens system equal to or longer than 1/2.5 of the focal lengths f1 and f3 of the first and the third lens systems. At the bottom, considering expected practical use, the telecentric imaging optical system should satisfy:

$$f1/2.5 < -f2 < 2 \cdot f1$$

$$f3/2.5 < -f2 < 2 \cdot f3$$

Although the foregoing description hereinabove decides that the starting magnification is −1 on the premise f1=f3, the starting magnification may be set at −f3/f1 by changing the focal lengths f1 and f3 of the first and the third lens systems, which is needless to mention.

In the second aspect of the present invention, the telecentric imaging optical system requires that the second lens system is formed by a plurality of lenses and linked to a mechanism which drives the second lens system into slide movement while changing the focal length of the second lens system.

Thus, in the second aspect of the present invention, the focal length of the second lens system is varied concurrently with slide movement of the second lens system. Hence, the image magnification can be changed without moving the first and the third lens systems, an object point and an image point.

A. First Preferred Embodiment

FIG. 1 is a view of a telecentric imaging optical system according to a first preferred embodiment of the present invention. In FIG. 1, The telecentric imaging optical system includes first, second and third lens systems 10, 20 and 30 which are disposed in that order from the object side (i.e., from left to right in the drawing). The first lens system 10 consists of lenses 11 and 12 which are cemented to each other. Similarly, the third lens system 30 consists of lenses 31 and 32 which are cemented to each other. The focal lengths f1 and f3 of the lens systems 10 and 30 are both 100. On the other hand, the second lens system 20 is formed of three lenses 21, 22 and 23 which are cemented to each other. The focal length f2 of the second lens system 20 is −100.

Though not drawn in FIG. 1, the telecentric imaging optical system is equipped with a lens drive mechanism. When driven by the lens drive mechanism, the first, the second and the third lens systems 10, 20 and 30 slide along an optical axis Z to be remote from each other by desired distances, whereby the imaging magnification is changed. Tables 2 and 3 show the lens data of the telecentric imaging optical system of the first preferred embodiment.

TABLE 2

| Surface Number | Radius of Curvature ri | Distance di | Refractive Index nd | Abbe's Number νd |
|---|---|---|---|---|
| 1 | 122.11 | 3.20 | 1.75692 | 31.7 |
| 2 | 32.75 | 8.00 | 1.69350 | 50.8 |
| 3 | −117.50 | 93.28 | | |
| 4 | −73.05 | 1.60 | 1.52944 | 51.7 |
| 5 | 33.40 | 8.00 | 1.60717 | 40.4 |
| 6 | −33.40 | 1.60 | 1.52944 | 51.7 |
| 7 | 73.05 | 93.28 | | |
| 8 | 117.50 | 8.00 | 1.69350 | 50.8 |
| 9 | −32.75 | 3.20 | 1.75692 | 31.7 |
| 10 | −122.11 | | | |

TABLE 3

| Magnification | −0.500 | −1.000 | −2.000 |
|---|---|---|---|
| F-Number | 8.333 | 10.000 | 20.000 |
| Object Distance d0 | 96.387 | 146.506 | 146.355 |
| Distance d3 | 43.313 | 93.280 | 193.390 |
| Distance d7 | 193.393 | 93.280 | 43.100 |
| Image Distance d10 | 146.503 | 146.506 | 96.982 |
| hMAX | 4.000 | 4.000 | 4.000 |

In Tables 2 and 3 (and in all subsequent tables), the symbols used therein are defined as below.

ri: radius of curvature of the i-th lens surface from the object di: distance between the i-th lens surface and the (i+1)-th lens surface taken on the optical axis Z from the object nd: refractive index of glass at d-line vd: Abbe's number of glass F-number: effective F-number of the telecentric imaging optical system hMAX: maximum height of the object In the first preferred embodiment, when the image magnification is −1, the numerical aperture is 0.05 and the object-image distance is 513.

FIGS. 2A, 2B, 2C, 3A, 3B, 3C, 4A, 4B and 4C show aberrations of the telecentric imaging optical system at an imaging magnification of −0.5, −1 and −2.0. In the graphs (and also in all similar graphs which will be referred to later), the symbols C, d and F respectively represent aberrations at C-line (656.27 nm), d-line (587.56 nm) and F-line (486.13 nm). As to astigmatism and distortion, aberrations with respect to only d-line are illustrated. In the diagrams regarding astigmatism, the solid line S denotes a sagittal image surface while the dotted line M denotes a meridional image surface.

B. Second Preferred Embodiment

Figure 5:
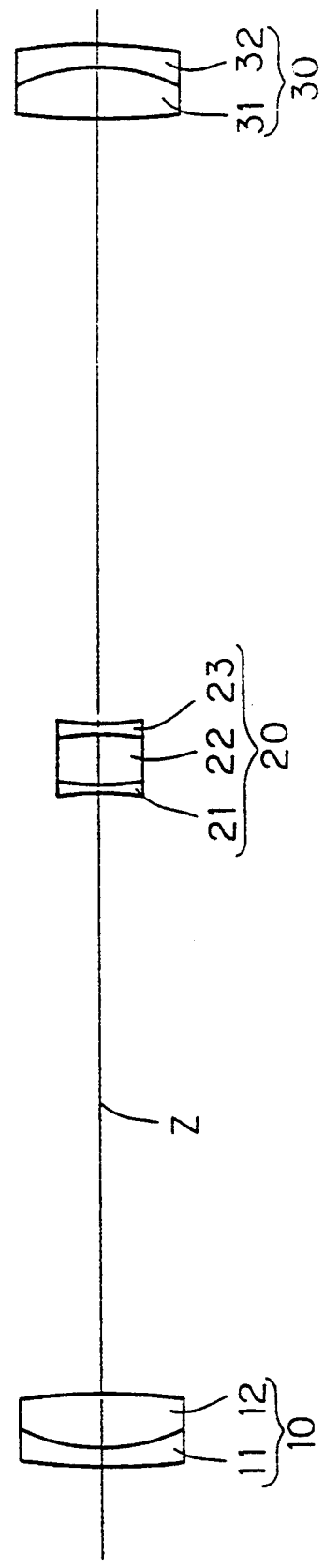
FIG. 5 is a view of a telecentric imaging optical system according to a second preferred embodiment of the present invention as it would be when used at an imaging magnification of −1.
Figure 7C:
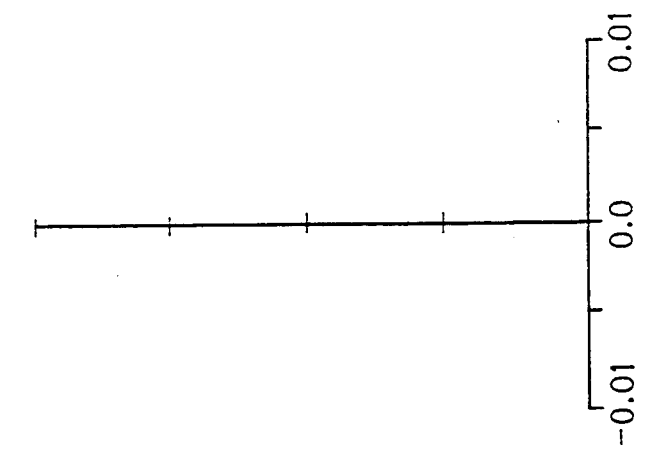
FIGS. 7A to 7C are graphs of spherical aberration, astigmatism and distortion that the telecentric imaging optical system of FIG. 5 creates at an imaging magnification of −1.
Figure 7B:
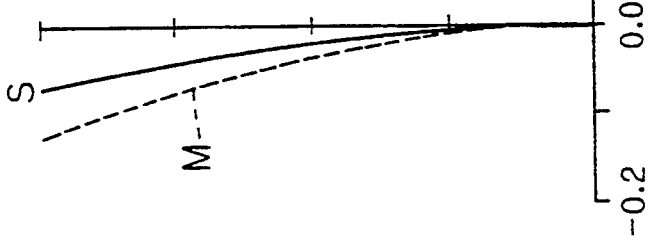
Figure 7A:
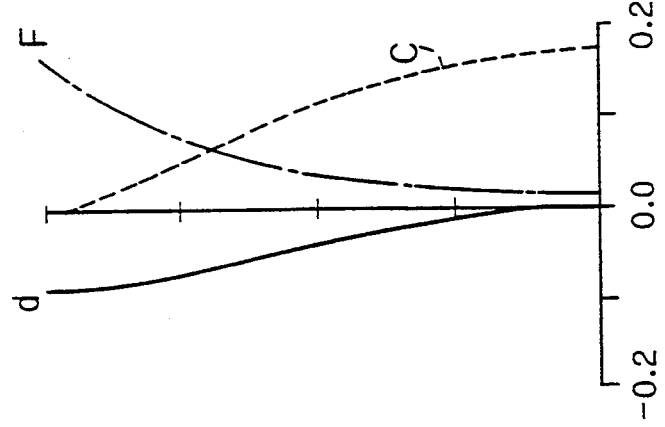
Figures 8A, 8B, 8C:
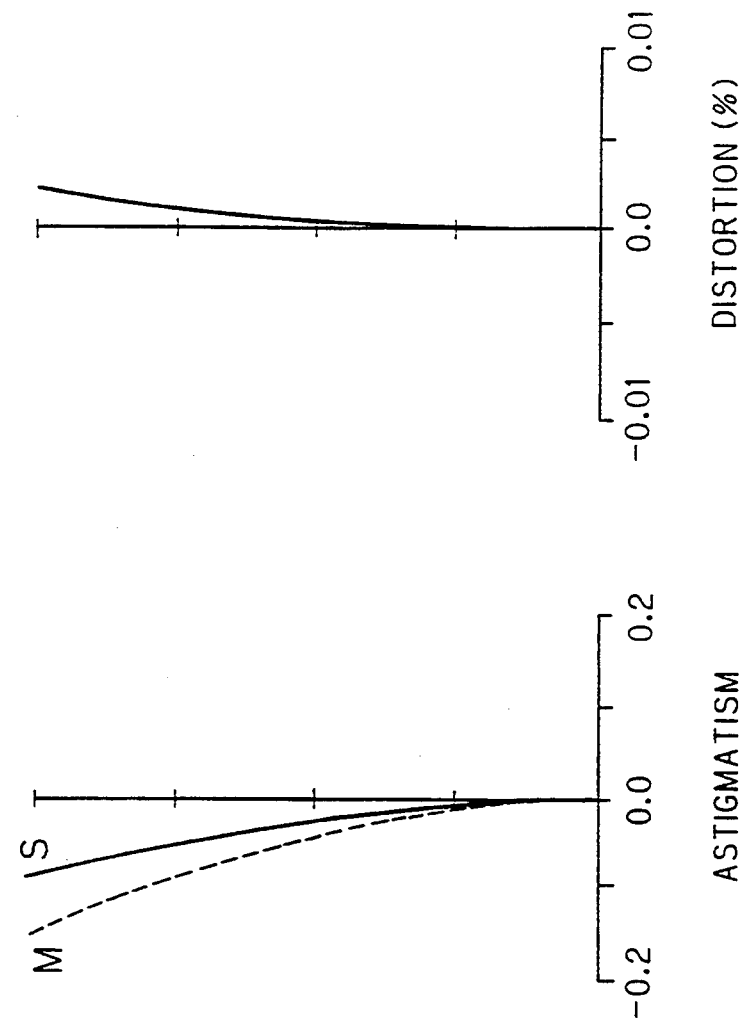
FIGS. 8A to 8C are graphs of spherical aberration, astigmatism and distortion that the telecentric imaging optical system of FIG. 5 creates at an imaging magnification of −1.1.

FIG. 5 is a view of a telecentric imaging optical system according to a second preferred embodiment of the present invention. The telecentric imaging optical system of the second preferred embodiment is identical in structure to the system of the first preferred embodiment, and therefore, similar description will not be repeated. The telecentric imaging optical system of the second preferred embodiment has the numerical aperture of 0.05 and the object-image distance of 513 when used at an imaging magnification of −1.

Tables 4 and 5 show the lens data of the telecentric imaging optical system of the second preferred embodiment.

TABLE 4

| Surface Number | Radius of Curvature ri | Distance di | Refractive Index nd | Abbe's Number νd |
| --- | --- | --- | --- | --- |
| 1 | 122.11 | 3.20 | 1.75692 | 31.7 |
| 2 | 32.75 | 8.00 | 1.69350 | 50.8 |
| 3 | −117.50 | 93.28 | | |
| 4 | −73.05 | 1.60 | 1.52944 | 51.7 |
| 5 | 33.40 | 8.00 | 1.60717 | 40.4 |
| 6 | −33.40 | 1.60 | 1.52944 | 51.7 |
| 7 | 73.05 | 93.28 | | |
| 8 | 117.50 | 8.00 | 1.69350 | 50.8 |
| 9 | −32.75 | 3.20 | 1.75692 | 31.7 |
| 10 | −122.11 | | | |

TABLE 5

| | | | |
| --- | --- | --- | --- |
| Magnification | −0.900 | −1.000 | −1.100 |
| F-Number | 9.000 | 10.000 | 11.000 |
| Distance d3 | 82.730 | 93.280 | 102.830 |
| Distance d7 | 103.830 | 93.280 | 83.730 |
| hMAX | 4.000 | 4.000 | 4.000 |

In the second preferred embodiments, and the first and the third systems 10 and 30 are fixed at certain locations, and so is an object. On the other hand, the second lens system 20 slides along the optical axis Z when driven by a lens drive mechanism (not shown). Adjustment of the spacings between the lens systems 10 to 30 is attained by the slide movement of the second lens system 20. Although the adjustment displaces an image point a little, the displacement is not beyond the level practically disturbing. This is because the quantity of the displacement is about the same as the quantity of aberrations the imaging optical system will cause, and the focal depth of the imaging optical system is large enough large to offset such a little displacement.

FIGS. 6A, 6B, 6C, 7A, 7B, 7C, 8A, 8B and 8C show aberrations of the imaging optical system of the second preferred embodiment at an imaging magnification of −0.9, −1 and −1.1.

C. Third Preferred Embodiment

Figure 9:
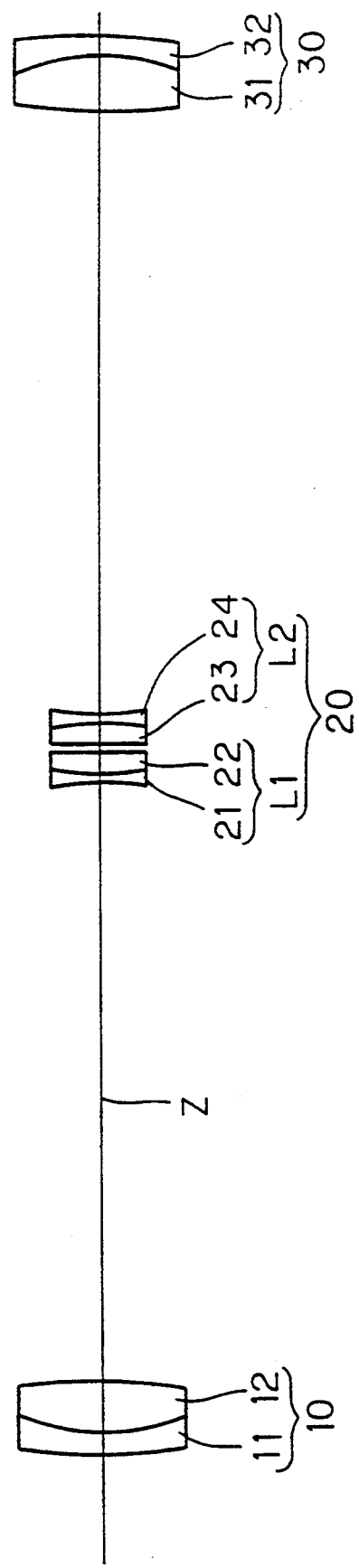
FIG. 9 is a view of a telecentric imaging optical system according to a third preferred embodiment of the present invention as it would be when used at an imaging magnification of −1.
Figure 16C:
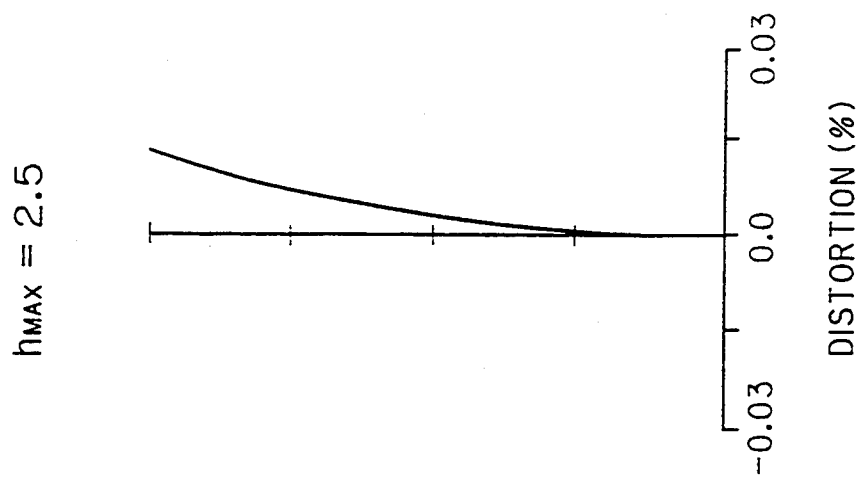
FIGS. 16A to 16C are graphs of spherical aberration, astigmatism and distortion that the telecentric imaging optical system of FIG. 13 creates at an imaging magnification of −2.0.
Figure 16B:
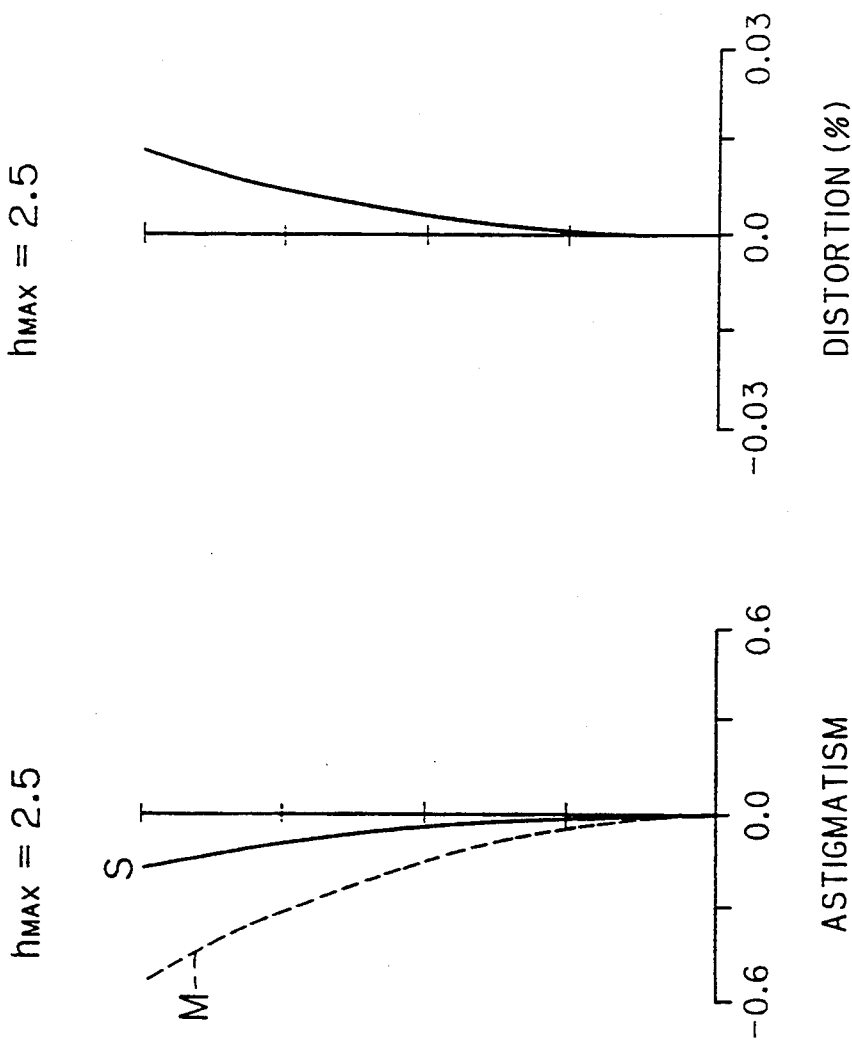
Figure 16A:
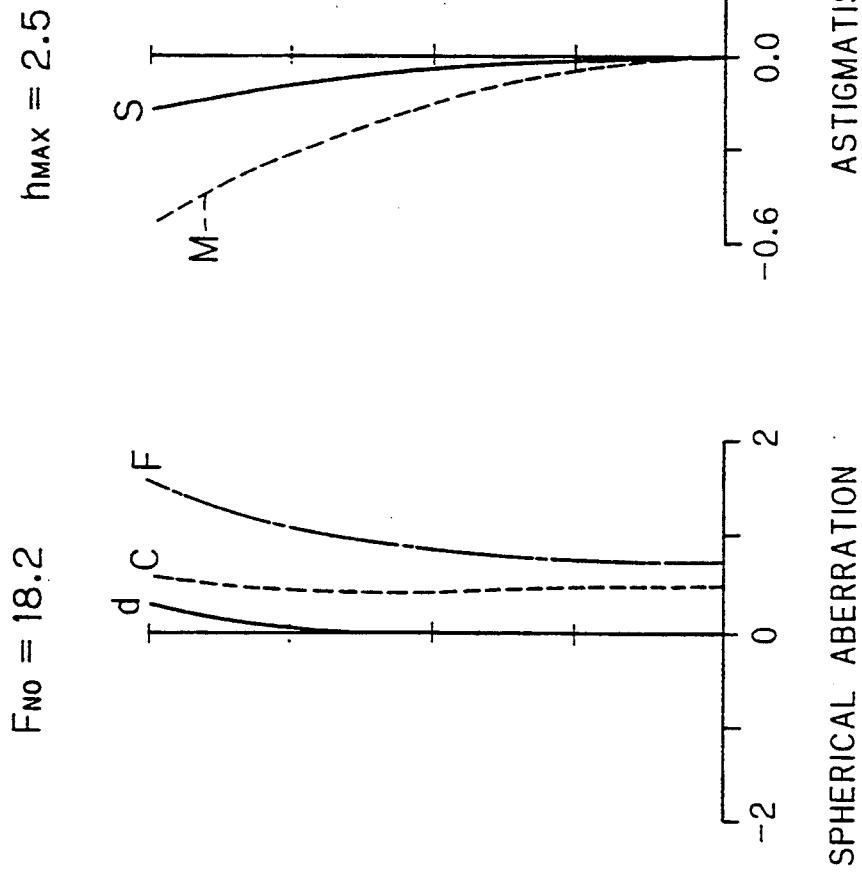
Figure 20A:
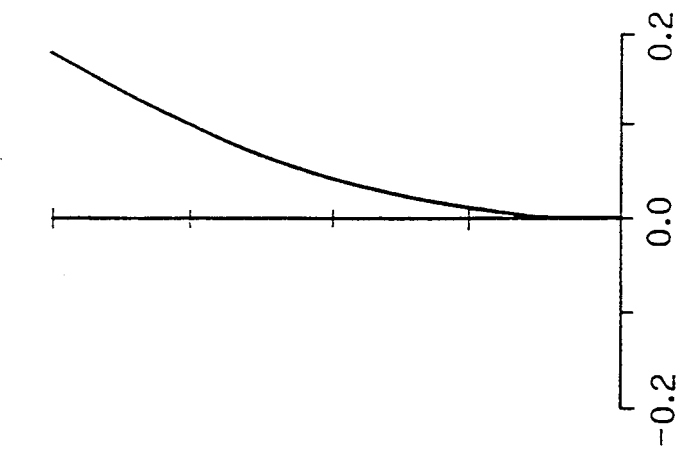
FIGS. 20A to 20C are graphs of spherical aberration, astigmatism and distortion that the telecentric imaging optical system of FIG. 17 creates at an imaging magnification of −2.0.
Figure 20B:
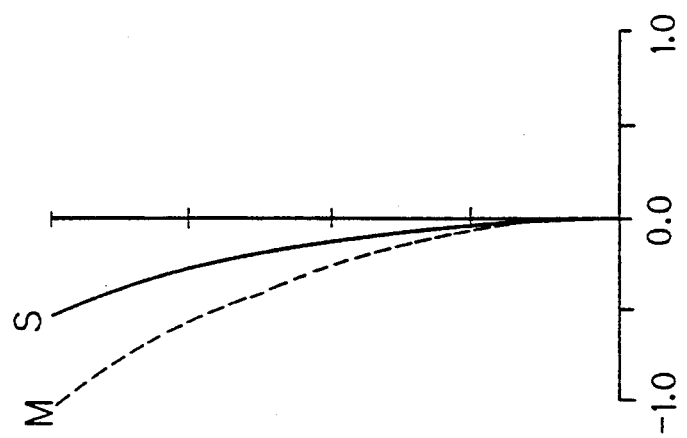
Figure 20C:
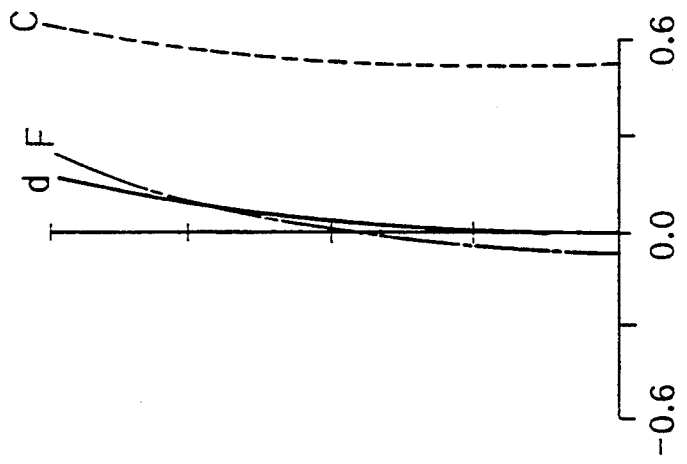
Figure 24C:
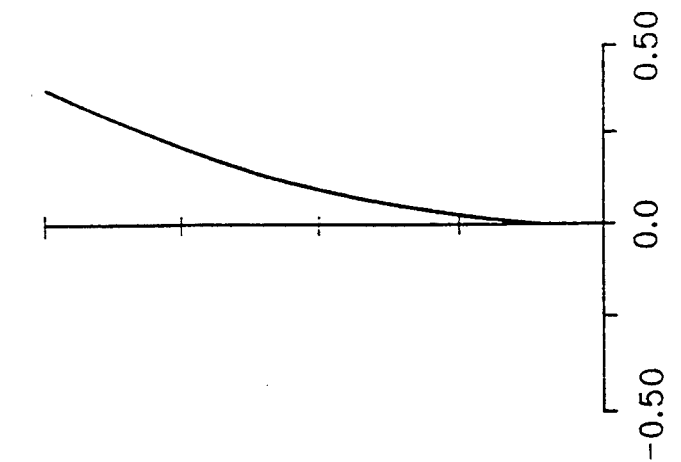
FIGS. 24A to 24C are graphs of spherical aberration, astigmatism and distortion that the telecentric imaging optical system of FIG. 21 creates at an imaging magnification of −2.0.
Figure 24B:
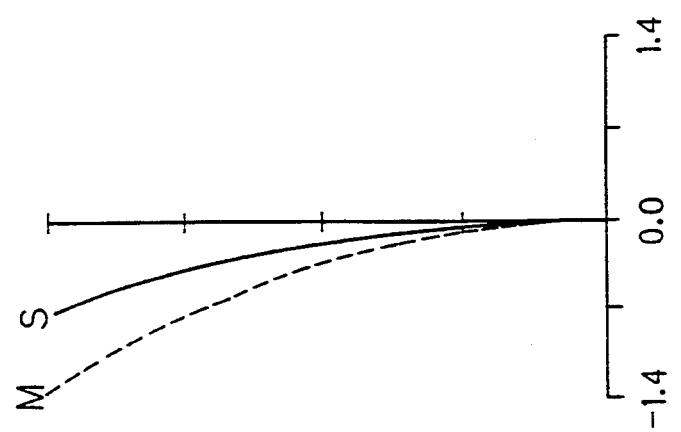
Figure 24A:
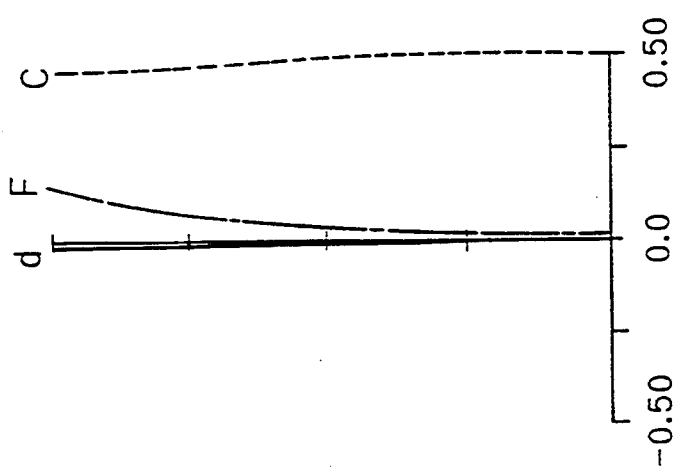

FIG. 9 is a view of a telecentric imaging optical system according to a third preferred embodiment of the present invention. Major differences of the system of the third preferred embodiment has against that of the first preferred embodiment are in the second lens system 20. First, the second lens system 20 is formed by a lens group L1 which consists of two lenses 21 and 22 cemented to each other and another lens group L2 which consists of two lenses 23 and 24 cemented to each other. Second, during slide movement of the second lens system 20 along the optical axis Z under the control of a lens drive mechanism (not shown), a distance d6 between the lens groups L1 and L2 changes to vary the focal length of the second lens system 20. Hence, a distance between an object and an image remains always constant even in this mode of construction wherein the locations of the object point, the image point, and the first and the third lens systems 10 and 30 are fixed. At an imaging magnification of −1, the numerical aperture is 0.05 and the object-image distance is 513.

Tables 6 and 7 show the lens data of the telecentric imaging optical system of the third preferred embodiment.

TABLE 6

| Surface Number | Radius of Curvature ri | Distance di | Refractive Index nd | Abbe's Number νd |
| --- | --- | --- | --- | --- |
| 1 | 122.11 | 3.20 | 1.75692 | 31.7 |
| 2 | 32.75 | 8.00 | 1.69350 | 50.8 |
| 3 | −117.50 | 93.28 | | |
| 4 | −73.05 | 1.60 | 1.52944 | 51.7 |
| 5 | 33.40 | 3.50 | 1.60717 | 40.4 |
| 6 | ∞ | 1.00 | | |
| 7 | ∞ | 3.50 | 1.60717 | 40.4 |
| 8 | −33.40 | 1.60 | 1.52944 | 51.7 |
| 9 | 73.05 | 93.28 | | |
| 10 | 117.50 | 8.00 | 1.69350 | 50.8 |
| 11 | −32.75 | 3.20 | 1.75692 | 31.7 |
| 12 | −122.11 | | | |

TABLE 7

| | | | |
| --- | --- | --- | --- |
| Magnification | −0.800 | −1.000 | −1.250 |
| F-Number | 8.000 | 10.000 | 12.500 |
| Distance d3 | 68.594 | 93.280 | 113.029 |
| Distance d6 | 5.937 | 1.000 | 5.937 |
| Distance d9 | 113.029 | 93.280 | 68.594 |
| hMAX | 4.000 | 4.000 | 3.200 |

FIGS. 10A, 10B, 10C, 11A, 11B, 11C, 12A, 12B and 12C show aberrations of the telecentric imaging optical system of the third preferred embodiment at an imaging magnification of −0.8, −1 and −1.25.

D. Fourth Preferred Embodiment

FIG. 13 is a view of a telecentric imaging optical system according to a fourth preferred embodiment of the present invention. The telecentric imaging optical system of the fourth preferred embodiment requires that the first and the third lens systems 10 and 30 are each formed by three lenses. This is where the telecentric imaging optical system of the fourth preferred embodiment departs from the system of the first preferred embodiment (FIG. 1) wherein the corresponding lens systems each consist of two lenses. Reduced spherical aberration and a larger aperture ratio which is made possible by the less aberration are a benefit of forming the first and the third positive power lens systems 10 and 30 by three lenses. In the telecentric imaging optical system of the fourth preferred embodiment, the numerical aperture is 0.055 and the object-image distance is 564 when the imaging magnification is −1.

Tables 8 and 9 show the lens data of the telecentric imaging optical system of the fourth preferred embodiment.

TABLE 8

| Surface Number | Radius of Curvature ri | Distance di | Refractive Index nd | Abbe's Number νd |
| --- | --- | --- | --- | --- |
| 1 | 109.00 | 10.000 | 1.71300 | 54.0 |
| 2 | −136.39 | 0.400 | | |
| 3 | 47.40 | 18.000 | 1.61025 | 56.7 |
| 4 | −64.30 | 4.000 | 1.74950 | 35.2 |
| 5 | 38.00 | 60.805 | | |
| 6 | −73.00 | 2.000 | 1.52944 | 51.7 |
| 7 | 31.50 | 10.000 | 1.60717 | 40.4 |
| 8 | −31.50 | 2.000 | 1.52944 | 51.7 |
| 9 | 73.00 | 60.805 | | |
| 10 | −38.00 | 4.000 | 1.74950 | 35.2 |
| 11 | 64.30 | 18.000 | 1.61025 | 56.7 |

TABLE 8-continued

| Surface Number | Radius of Curvature ri | Distance di | Refractive Index nd | Abbe's Number vd |
|---|---|---|---|---|
| 12 | −47.40 | 0.400 | | |
| 13 | 136.39 | 10.000 | 1.71300 | 54.0 |
| 14 | −109.00 | | | |

TABLE 9

| Magnification | −0.500 | −1.000 | −2.000 |
|---|---|---|---|
| F-Number | 4.546 | 9.091 | 18.182 |
| Object distance d0 | 130.401 | 182.000 | 182.123 |
| Distance d5 | 9.620 | 60.805 | 163.429 |
| Distance d9 | 163.427 | 60.805 | 9.500 |
| Image distance d14 | 182.163 | 182.000 | 130.559 |
| hMAX | 5.000 | 5.000 | 2.500 |

FIGS. 14A, 14B, 14C, 15A, 15B, 15C, 16A, 16B and 16C are diagrams showing aberrations of the telecentric imaging optical system of the fourth preferred embodiment at an imaging magnification of −0.5, −1 and −2.

E. Fifth Preferred Embodiment

FIG. 17 is a view of a telecentric imaging optical system according to a fifth preferred embodiment of the present invention. The telecentric imaging optical system of the fifth preferred embodiment is unique in that the first and the third positive power lens systems 10 and 30 are each formed by two doublets. The first lens system 10 consists of doublets D1 and D2 while the third lens system 30 consists of doublets D3 and D4. Due to this structure, the telecentric imaging optical system of the fifth preferred embodiment ensures that the size of the image is larger as compared with that in the first preferred embodiment. The system of the fifth preferred embodiment is otherwise the same as the system of the first preferred embodiment. When used at an imaging magnification of −1, the telecentric imaging optical system of the fifth preferred embodiment has a numerical aperture of 0.06 and an object-image distance of 522.

Tables 10 and 11 show values of parameters concerning the telecentric imaging optical system of the fifth preferred embodiment.

TABLE 10

| Surface Number | Radius of Curvature ri | Distance di | Refractive Index nd | Abbe's Number vd |
|---|---|---|---|---|
| 1 | −500.00 | 8.00 | 1.67790 | 55.6 |
| 2 | −45.70 | 3.00 | 1.74950 | 35.2 |
| 3 | −96.00 | 0.50 | | |
| 4 | 162.50 | 3.00 | 1.74950 | 35.2 |
| 5 | 57.30 | 8.00 | 1.67790 | 55.6 |
| 6 | −400.00 | 90.90 | | |
| 7 | −71.70 | 2.00 | 1.52682 | 51.1 |
| 8 | 33.00 | 8.00 | 1.60717 | 40.4 |
| 9 | −33.00 | 2.00 | 1.52682 | 51.1 |
| 10 | 71.70 | 90.90 | | |
| 11 | 400.00 | 8.00 | 1.67790 | 55.6 |
| 12 | −57.30 | 3.00 | 1.74950 | 35.2 |
| 13 | −162.50 | 0.50 | | |
| 14 | 96.00 | 3.00 | 1.74950 | 35.2 |
| 15 | 45.70 | 8.00 | 1.67790 | 55.6 |
| 16 | 500.00 | | | |

TABLE 11

| Magnification | −0.500 | −1.000 | −2.000 |
|---|---|---|---|
| F-Number | 4.167 | 8.333 | 16.667 |
| Object distance d0 | 90.522 | 141.600 | 141.642 |
| Distance d6 | 41.140 | 90.900 | 191.711 |
| Distance d10 | 191.710 | 90.900 | 41.140 |

TABLE 11-continued

| Image distance d16 | 141.642 | 141.614 | 90.521 |
|---|---|---|---|
| hMAX | 10.000 | 10.000 | 5.000 |

FIGS. 18A, 18B, 18C, 19A, 19B, 19C, 20A, 20B and 20C are diagrams showing aberrations of the imaging optical system of the fifth preferred embodiment at an imaging magnification of −0.5, −1 and −2.

F. Sixth Preferred Embodiment

FIG. 21 is a view of a telecentric imaging optical system according to a sixth preferred embodiment of the present invention. The telecentric imaging optical system of the sixth preferred embodiment has the same structure as the that of the system of the fifth preferred embodiment except for the value of the focal length f2 of the second lens system 20. More precisely, while set at −100 in the fifth preferred embodiment, the focal length f2 is −150 in the sixth preferred embodiment. Hence, a distance between an object and an image is shorter than it is in the fifth preferred embodiment. When used at an imaging magnification of −1, the telecentric imaging optical system of the sixth preferred embodiment has a numerical aperture of 0.06 and an object-image distance of 485.

Tables 12 and 13 show values of parameters concerning the telecentric imaging optical system of the sixth preferred embodiment.

TABLE 12

| Surface Number | Radius of Curvature ri | Distance di | Refractive Index nd | Abbe's Number vd |
|---|---|---|---|---|
| 1 | −1000.00 | 8.00 | 1.67790 | 55.6 |
| 2 | −48.50 | 3.00 | 1.74950 | 35.2 |
| 3 | −105.50 | 0.50 | | |
| 4 | 200.00 | 3.00 | 1.74950 | 35.2 |
| 5 | 60.00 | 8.00 | 1.67790 | 55.6 |
| 6 | −262.00 | 90.45 | | |
| 7 | −107.55 | 2.00 | 1.52682 | 51.1 |
| 8 | 49.50 | 8.00 | 1.60717 | 40.4 |
| 9 | −49.50 | 2.00 | 1.52682 | 51.1 |
| 10 | 107.55 | 90.45 | | |
| 11 | 262.00 | 8.00 | 1.67790 | 55.6 |
| 12 | −60.00 | 3.00 | 1.74950 | 35.2 |
| 13 | −200.00 | 0.50 | | |
| 14 | 105.50 | 3.00 | 1.74950 | 35.2 |
| 15 | 48.50 | 8.00 | 1.67790 | 55.6 |
| 16 | 1000.00 | | | |

TABLE 13

| Magnification | −0.500 | −0.667 | −1.000 | −1.500 | −2.000 |
|---|---|---|---|---|---|
| F-Number | 4.167 | 5.556 | 8.333 | 12.500 | 16.667 |
| Object Distance d0 | 32.110 | 83.607 | 123.617 | 137.558 | 138.085 |
| Distance d6 | 15.150 | 40.160 | 90.450 | 166.760 | 242.790 |
| Distance d10 | 242.790 | 166.750 | 90.450 | 40.080 | 15.150 |
| Image Distance d16 | 138.085 | 137.618 | 123.618 | 83.737 | 32.110 |
| hMAX | 10.000 | 10.000 | 10.000 | 7.000 | 5.000 |

Aberrations of the telecentric imaging optical system of the sixth preferred embodiment at an imaging magnification of −0.5, −1 and −2 are shown in FIGS. 22A, 22B, 22C, 23A, 23B, 23C, 24A, 24B and 24C.

G. Seventh Preferred Embodiment

Figure 25:
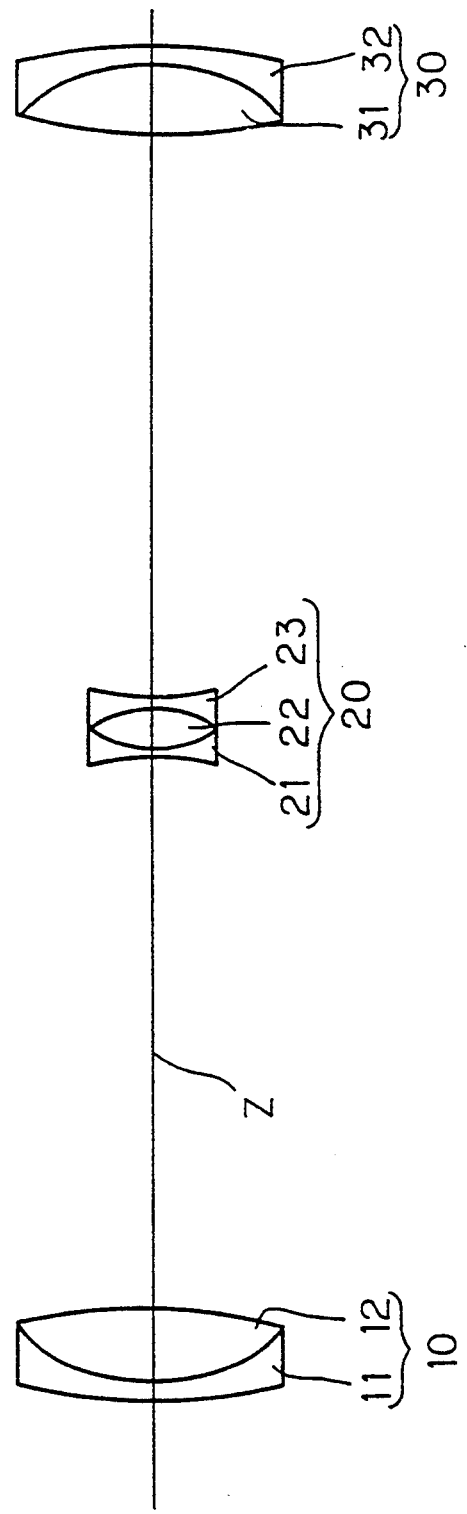
FIG. 25 is a view of a telecentric imaging optical system according to a seventh preferred embodiment of the present invention as it would be when used at an imaging magnification of −1.
Figure 27A:
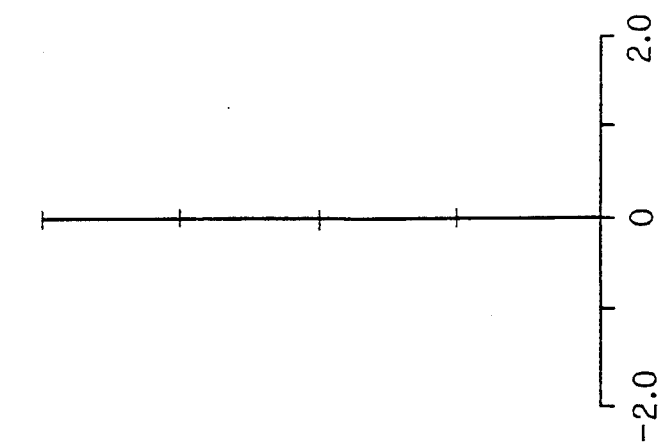
FIGS. 27A to 27C are graphs of spherical aberration, astigmatism and distortion that the telecentric imaging optical system of FIG. 25 creates at an imaging magnification of −1.
Figure 27B:
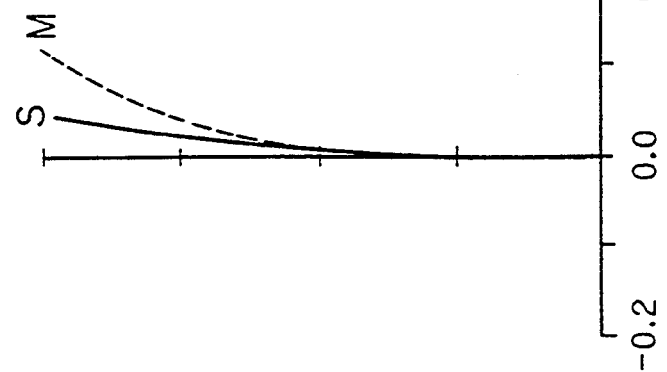
Figure 27C:
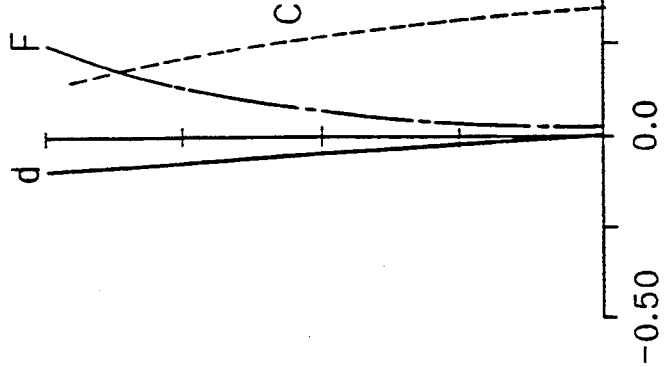

FIG. 25 is a view of a telecentric imaging optical system according to a seventh preferred embodiment of the present invention. The telecentric imaging optical system of the seventh preferred embodiment is constructed identical to the telecentric imaging optical system of the first preferred embodiment except for the value of the focal length f2 of the second lens system 20.

That is, the value of the focal length f2 is −50 in the seventh preferred embodiment while the value of the focal length f2 in the first preferred embodiment is −100. This gives a larger variable power ratio to the seventh preferred embodiment than to the first preferred embodiment. When used at an imaging magnification of −1, the telecentric imaging optical system of the seventh preferred embodiment has a numerical aperture of 0.035 and an object-image distance of 618.6.

Tables 14 and 15 show the lens data of the telecentric imaging optical system of the seventh preferred embodiment.

TABLE 14

| Surface Number | Radius of Curvature ri | Distance di | Refractive Index nd | Abbe's Number νd |
|---|---|---|---|---|
| 1 | 96.00 | 3.00 | 1.74000 | 31.7 |
| 2 | 30.20 | 11.00 | 1.67790 | 50.7 |
| 3 | −150.00 | 92.30 | | |
| 4 | −39.00 | 1.20 | 1.54814 | 45.9 |
| 5 | 18.30 | 7.00 | 1.62588 | 35.6 |
| 6 | −18.30 | 1.20 | 1.54814 | 45.9 |
| 7 | 39.00 | 92.30 | | |
| 8 | 150.00 | 11.00 | 1.67790 | 50.7 |
| 9 | −30.20 | 3.00 | 1.74000 | 31.7 |
| 10 | −96.00 | | | |

TABLE 15

| Magnification | −0.250 | −0.500 | −1.000 | −2.000 | −4.000 |
|---|---|---|---|---|---|
| F-Number | 8.741 | 10.000 | 14.286 | 28.571 | 57.143 |
| Object Distance d0 | 140.019 | 199.204 | 198.300 | 172.813 | 144.870 |
| Distance d3 | 55.080 | 67.400 | 92.300 | 141.803 | 241.268 |
| Distance d7 | 241.247 | 141.803 | 92.300 | 67.400 | 55.100 |
| Image Distance d10 | 144.873 | 172.813 | 198.320 | 199.207 | 139.989 |
| hMAX | 20.000 | 10.000 | 5.000 | 5.000 | 5.000 |

Aberrations of the telecentric imaging optical system of the seventh preferred embodiment at an imaging magnification of −0.25, −1 and −4 are shown in FIGS. 26A, 26B, 26C, 27A, 27B, 27C, 28A, 28B and 28C.

As heretofore described, the telecentric imaging optical systems of the present invention each have a larger variable power ratio. In addition, all the preferred embodiments promise excellent flatness of the image surface and a large image size.

While the invention has been described in detail, the foregoing description is in all aspects illustrative and not restrictive. It is understood that numerous other modifications and variations can be devised without departing from the scope of the invention.

We claim:

1. A telecentric imaging optical system for forming an image of an object, said optical system comprising:
a first lens system having a positive focal length f1, a second lens system having a negative focal length f2, and a third lens system having a positive focal length f3, said lens systems being disposed in order along an optical axis of said optical system, said second lens system being located between said first lens system and said third lens system;
wherein said third lens system is disposed so that the front focal point thereof substantially coincides with the rear focal point of the composite lens system consisting of said first lens system and said second lens system;
wherein said focal lengths satisfy the conditions:

$$f1/2.5 < -f2 < 2 \times f1$$

$$f3/2.5 < -f2 < 2 \times f3$$

so as to provide said optical system with an increased variable power ratio,
and wherein at least one of said lens systems is movable along said optical axis so as to change a first distance between said first lens system and said second lens system and a second distance between said second lens system and said third lens system, to thereby vary the magnification of said optical system, while maintaining telecentricity.

2. The telecentric imaging optical system of claim 1, wherein each of said first, second and third lens systems has a plurality of lenses.

3. The telecentric imaging optical system of claim 2, wherein said first lens system and said third lens system are fixed on the optical axis, and wherein said second lens system is movable along said optical axis.

4. The telecentric imaging optical system of claim 3, wherein said second lens system has a plurality of lens groups, and wherein said lens groups are movable along said optical axis so as to change the distance therebetween.

5. The telecentric imaging optical system of claim 2, wherein each of said first and third lens systems comprises two lenses.

6. The telecentric imaging optical system of claim 2, wherein each of said first and third lens systems has a focal length of 100.

7. The telecentric imaging optical system of claim 2, wherein said second lens system comprises three lenses.

8. The telecentric imaging optical system of claim 2, wherein said second lens system has a focal length of −100.

9. The telecentric imaging optical system of claim 2, wherein said second lens system comprises two lens groups spaced apart by a distance, each of said lens groups comprising two lenses, the distance between the lens groups being variable in correspondence with movement of said at least one of said lens systems, such that a distance between the object and the image always remains constant.

10. The telecentric imaging optical system of claim 2, wherein each of said first and third lens systems has three lenses.

11. The telecentric imaging optical system of claim 2, wherein each of said first and third lens systems comprises two lens groups.

12. The telecentric imaging optical system of claim 11, wherein each of said two lens groups comprises two lenses.

13. The telecentric imaging optical system of claim 12, wherein said second lenses system comprises three lens.

14. The telecentric imaging optical system of claim 13, wherein said second lens system has a focal length of −150.

15. The telecentric imaging optical system of claim 13, wherein said second lens system has a focal length of −50.

* * * * *